US011220816B2

(12) United States Patent
Tiramani et al.

(10) Patent No.: US 11,220,816 B2
(45) Date of Patent: Jan. 11, 2022

(54) EQUIPMENT AND METHODS FOR ERECTING A TRANSPORTABLE FOLDABLE BUILDING STRUCTURE

(71) Applicant: Build IP LLC, Las Vegas, NV (US)

(72) Inventors: Paolo Tiramani, Las Vegas, NV (US); Galiano Tiramani, Las Vegas, NV (US); Kyle Denman, North Las Vegas, NV (US)

(73) Assignee: Build IP LLC, North Las Vegas, NV (US)

( * ) Notice: Subject to any disclaimer, the term of this patent is extended or adjusted under 35 U.S.C. 154(b) by 74 days.

(21) Appl. No.: 16/786,315

(22) Filed: Feb. 10, 2020

(65) Prior Publication Data

US 2020/0263413 A1 Aug. 20, 2020

Related U.S. Application Data

(60) Provisional application No. 62/960,991, filed on Jan. 14, 2020, provisional application No. 62/805,710, filed on Feb. 14, 2019.

(51) Int. Cl.
*E04B 1/344* (2006.01)
*E04C 2/284* (2006.01)
(Continued)

(52) U.S. Cl.
CPC ............. *E04B 1/344* (2013.01); *B32B 5/024* (2013.01); *B32B 5/18* (2013.01); *B32B 5/20* (2013.01);
(Continued)

(58) Field of Classification Search
CPC .... E04B 1/3444; E04B 1/3442; E04B 1/3445; E04B 1/34357; E04B 1/34384;
(Continued)

(56) References Cited

U.S. PATENT DOCUMENTS 3,469,356 A 9/1969 White
3,863,404 A 2/1975 Wahlquist
(Continued)

FOREIGN PATENT DOCUMENTS

CA 2442403 C 12/2008
EP 3059357 A1 8/2016

OTHER PUBLICATIONS

U.S. Appl. No. 15/931,768, filed May 14, 2020, Paolo Tiramani et al.
(Continued)

*Primary Examiner* — Brian E Glessner
*Assistant Examiner* — Daniel J Kenny
(74) *Attorney, Agent, or Firm* — McCarter & English, LLP

(57) ABSTRACT

A foldable building structure package having a first folded configuration and a second unfolded configuration. The package has a first enclosure component portion and an enclosure member selected from the group consisting of an enclosure component and a second enclosure component portion, with the enclosure member being joined to and moveable with respect to the first enclosure component portion from a folded position to an unfolded position to form a first part of the building structure in its second unfolded configuration. There is a first deployment bracket secured to the first enclosure component portion, a deployment strut adapted to be secured to the first deployment bracket at a first end and having a rotatable sheave at a second end, and a fastener positioned on the enclosure member for receiving a line run from the tang over the rotatable sheave.

16 Claims, 26 Drawing Sheets

(51) Int. Cl.
 *B32B 5/18* (2006.01)
 *B32B 5/32* (2006.01)
 *B32B 15/04* (2006.01)
 *B32B 5/02* (2006.01)
 *E04B 1/343* (2006.01)
 *B32B 5/20* (2006.01)
 *B32B 5/24* (2006.01)
 *E04B 1/348* (2006.01)

(52) U.S. Cl.
 CPC .............. *B32B 5/245* (2013.01); *B32B 5/32* (2013.01); *B32B 15/046* (2013.01); *E04B 1/3442* (2013.01); *E04B 1/34357* (2013.01); *E04B 1/34384* (2013.01); *E04B 1/34853* (2013.01); *E04C 2/284* (2013.01); *B32B 2262/101* (2013.01); *B32B 2419/00* (2013.01); *E04B 2001/34389* (2013.01)

(58) Field of Classification Search
 CPC .......... E04B 2001/34389; E04B 7/166; E04H 2001/1283
 See application file for complete search history.

(56) References Cited

U.S. PATENT DOCUMENTS

| | | | |
|---|---|---|---|
| 3,866,365 A | 2/1975 | Honigman | |
| 3,984,949 A | 10/1976 | Wahlquist | |
| 4,074,475 A | 2/1978 | Wahlquist | |
| 4,155,204 A | 5/1979 | Prozinski | |
| 4,534,141 A | 8/1985 | Fagnoni | |
| 4,689,924 A | 9/1987 | Jurgensen | |
| 4,780,996 A | 11/1988 | Julien, Jr. | |
| 5,345,730 A | 9/1994 | Jurgensen | |
| 5,461,832 A | 10/1995 | Smith | |
| 5,596,844 A | 1/1997 | Kalinowski | |
| 5,761,854 A | 6/1998 | Johnson | |
| 5,845,441 A * | 12/1998 | Swartz | E04B 1/04 52/250 |
| 6,223,479 B1 | 5/2001 | Stockl | |
| 6,481,165 B1 | 11/2002 | Romary et al. | |
| 7,882,659 B2 | 2/2011 | Gyory et al. | |
| 7,930,857 B2 | 4/2011 | Pope | |
| 8,166,715 B2 | 5/2012 | De Azambuja | |
| 8,201,362 B2 | 6/2012 | Alford et al. | |
| 8,347,560 B2 | 1/2013 | Gyory et al. | |
| 8,474,194 B2 | 7/2013 | Tiramani | |
| 8,733,029 B2 | 5/2014 | Tiramani | |
| 8,806,833 B2 * | 8/2014 | Lafferty, III | E04C 2/384 52/630 |
| 2002/0179598 A1 | 12/2002 | Kuhn | |
| 2005/0283371 A1 | 12/2005 | Tiramani | |
| 2007/0079573 A1 | 4/2007 | Sarine et al. | |
| 2009/0217600 A1 | 9/2009 | De Azambuja | |
| 2009/0266006 A1 | 10/2009 | Gyory et al. | |
| 2010/0269419 A1 | 10/2010 | Gyory et al. | |
| 2011/0126479 A1 | 6/2011 | Alford et al. | |
| 2012/0006369 A1 | 1/2012 | Cantin et al. | |
| 2014/0150352 A1 | 6/2014 | Lee | |
| 2015/0252558 A1 * | 9/2015 | Chin | E04B 1/34823 52/79.7 |
| 2017/0030071 A1 | 2/2017 | Sorensen et al. | |
| 2018/0313074 A1 | 11/2018 | Brown et al. | |
| 2019/0100908 A1 | 4/2019 | Tiramani et al. | |

OTHER PUBLICATIONS

U.S. Appl. No. 16/143,598, filed Sep. 27, 2018, Paolo Tiramani et al.
U.S. Appl. No. 16/786,202, filed Feb. 10, 2020, Paolo Tiramani et al.
U.S. Appl. No. 16/786,130, filed Feb. 10, 2020, Paolo Tiramani et al.
U.S. Appl. No. 16/804,473, filed Feb. 28, 2020, Paolo Tiramani et al.
International Search Report and Written Opinion from related International Patent Application No. PCT/US2020/017528 dated May 1, 2020.

* cited by examiner

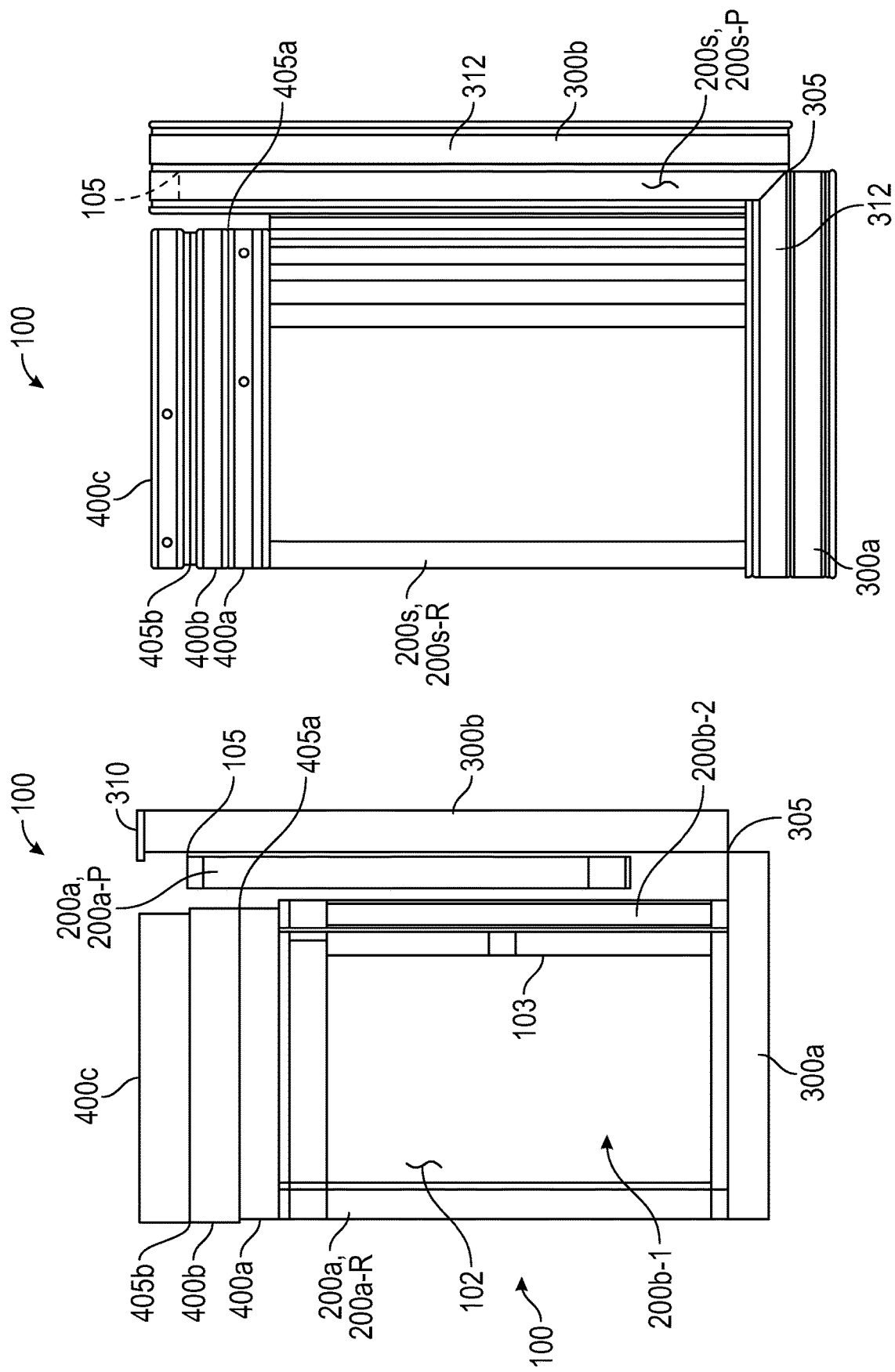

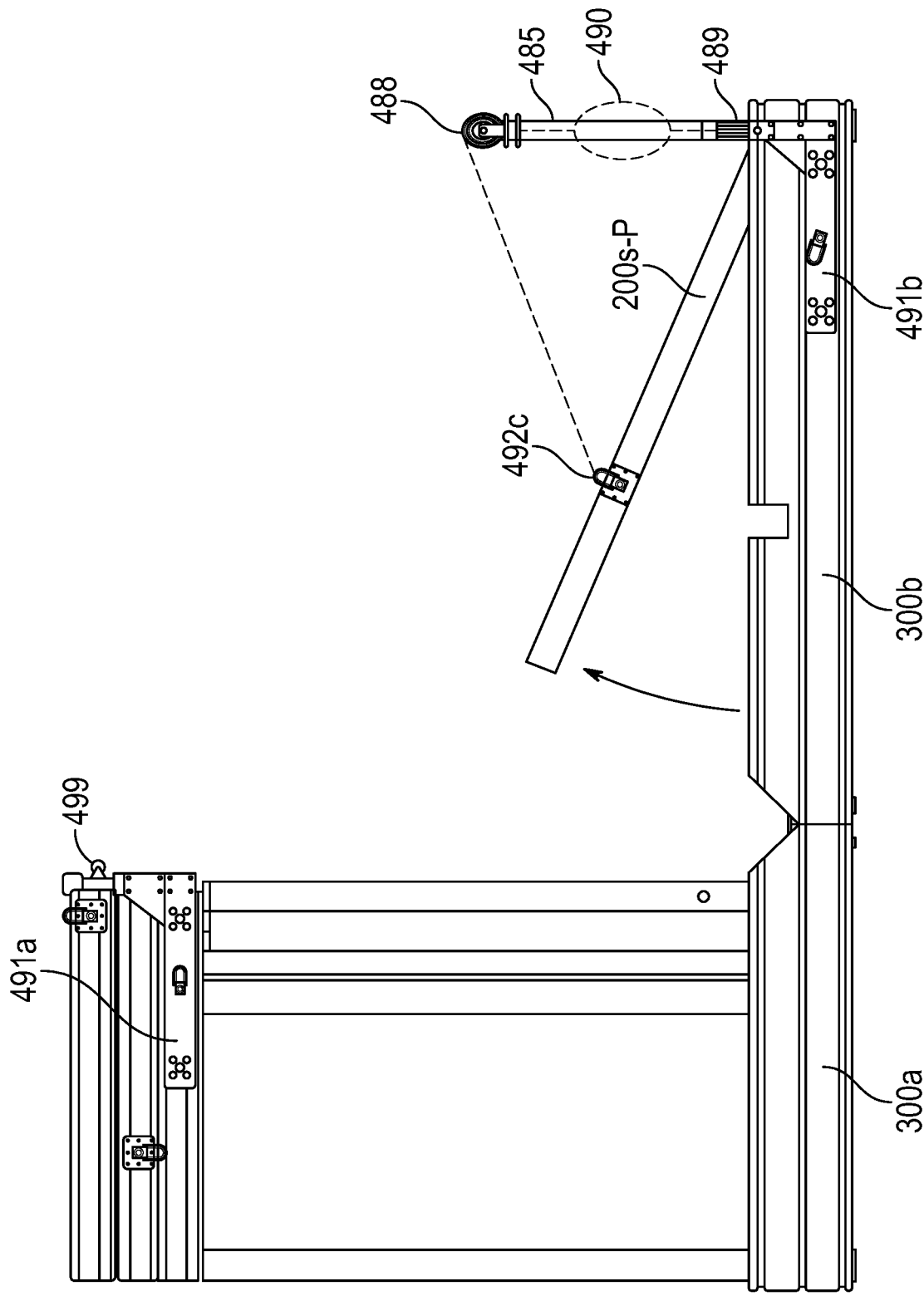

EQUIPMENT AND METHODS FOR ERECTING A TRANSPORTABLE FOLDABLE BUILDING STRUCTURE

CROSS-REFERENCES TO RELATED APPLICATIONS

This application claims the benefit of U.S. Provisional Application No. 62/805,710, filed Feb. 14, 2019 and U.S. Provisional Application No. 62/960,991, filed Jan. 14, 2020.

BACKGROUND OF THE INVENTION

Field of the Invention

The inventions herein relate to transportable building structures, such as dwellings and other buildings for residential occupancy, commercial occupancy and/or material storage, components for such structures, and to equipment and techniques for constructing those structures.

Description of the Related Art

In the field of residential housing, the traditional technique for building homes is referred to as "stick-built" construction, where a builder constructs housing at the intended location using in substantial part raw materials such as wooden boards, plywood panels, and steel Lally columns. The materials are assembled piece by piece over a previously prepared portion of ground, for example, a poured concrete slab or a poured concrete or cinder block foundation.

There have been a variety of efforts to depart from the conventional construction techniques used to create dwellings, as well as commercial spaces and like. One of the alternatives to stick-built construction is very generally referred to as modular housing. As opposed to stick-built construction, where the structure is built on-site, a modular house is constructed in a factory and then shipped to the site, often by means of a tractor-trailer. A drawback of modular housing is that the prospective buyer can customize the structure layout only to a relatively limited degree. That is, while certain features, for example a closet, may be added or subtracted from a room, the general shape and layout of the house cannot be changed or adapted to the customer's preference.

Additionally, modular housing often exceeds in size normally-permitted legal limits for road transport. For example, in the United States the maximum permitted dimensions for road transport are in general 102 inches (259.1 cm) in width, 13.5 feet (4.11 m) in height and 65 to 75 feet (19.81 to 22.86 m) in length. Thus, in many cases transporting a modular house from factory to site requires oversize load permits, which may impose restrictions on when transport can be undertaken and what routes can be utilized. Oversize road regulations may also require the use of an escort car and a trailing car as well. All of these requirements and restrictions inevitably increase the cost of the modular housing.

Significant advancements in the construction of dwellings and commercial space are described in U.S. Pat. Nos. 8,474,194, 8,733,029 and U.S. Patent Publication No. 2019/0100908. In one aspect, those patent documents pertain to fabricating wall, floor and ceiling components in a factory that are folded together into a compact shipping module, and which are then transported to the intended location and unfolded to yield a structure.

SUMMARY OF THE INVENTION

The present inventions are directed to equipment and techniques that ease siting of the foldable structure of the present inventions, and which ease deployment of enclosure components and portions thereof (reducing or eliminating the need for a crane), to thereby reduce on-site set-up costs.

In one aspect, the present inventions are directed to a foldable building structure package having a first folded configuration and a second unfolded configuration, comprising a first enclosure component portion and an enclosure member selected from the group consisting of an enclosure component and a second enclosure component portion, with the enclosure member joined to and moveable with respect to the first enclosure component portion from a folded position to an unfolded position to form a first part of the building structure in its second unfolded configuration; a first deployment bracket secured to the first enclosure component portion; a deployment strut adapted to be secured to and removed from the first deployment bracket at a first end and having a rotatable sheave at a second end; and a fastener positioned on the enclosure member for receiving a line run over the rotatable sheave.

In another aspect, the present inventions are directed to a folded building structure package having an enclosure component portion moveable from a folded position to an unfolded position, comprising a first enclosure component portion having a first edge, a second edge separated from the first edge by a width, with the first enclosure component defining two spaced-apart passages between the first edge and the second edge; a second enclosure component portion joined to and moveable with respect to the first enclosure component portion from a folded position to an unfolded position to form a first part of the building structure in an unfolded configuration; and two elongate members, each having a length greater than the width of the first enclosure component portion and adapted to be received in either of the two spaced-apart passages.

In yet other aspects, the present inventions are directed to friction-reducing components that ease the movement of enclosure component portions from their folded positions to their unfolded positions.

These and other aspects of the present inventions are described in the drawings annexed hereto, and in the description of the preferred embodiments and claims set forth below.

BRIEF DESCRIPTION OF THE DRAWINGS

FIGS. 3A and 3B are end views of shipping modules from which are formed the finished structures respectively shown in FIGS. 1A and 1B.

FIG. 13B is a side view of a shipping module prepared in accordance with the present inventions, depicting as fully deployed the floor portion that is partially deployed in FIG. 13A, and depicting a partially deployed wall component.

DETAILED DESCRIPTION OF THE PREFERRED EMBODIMENTS

Figure 1A:
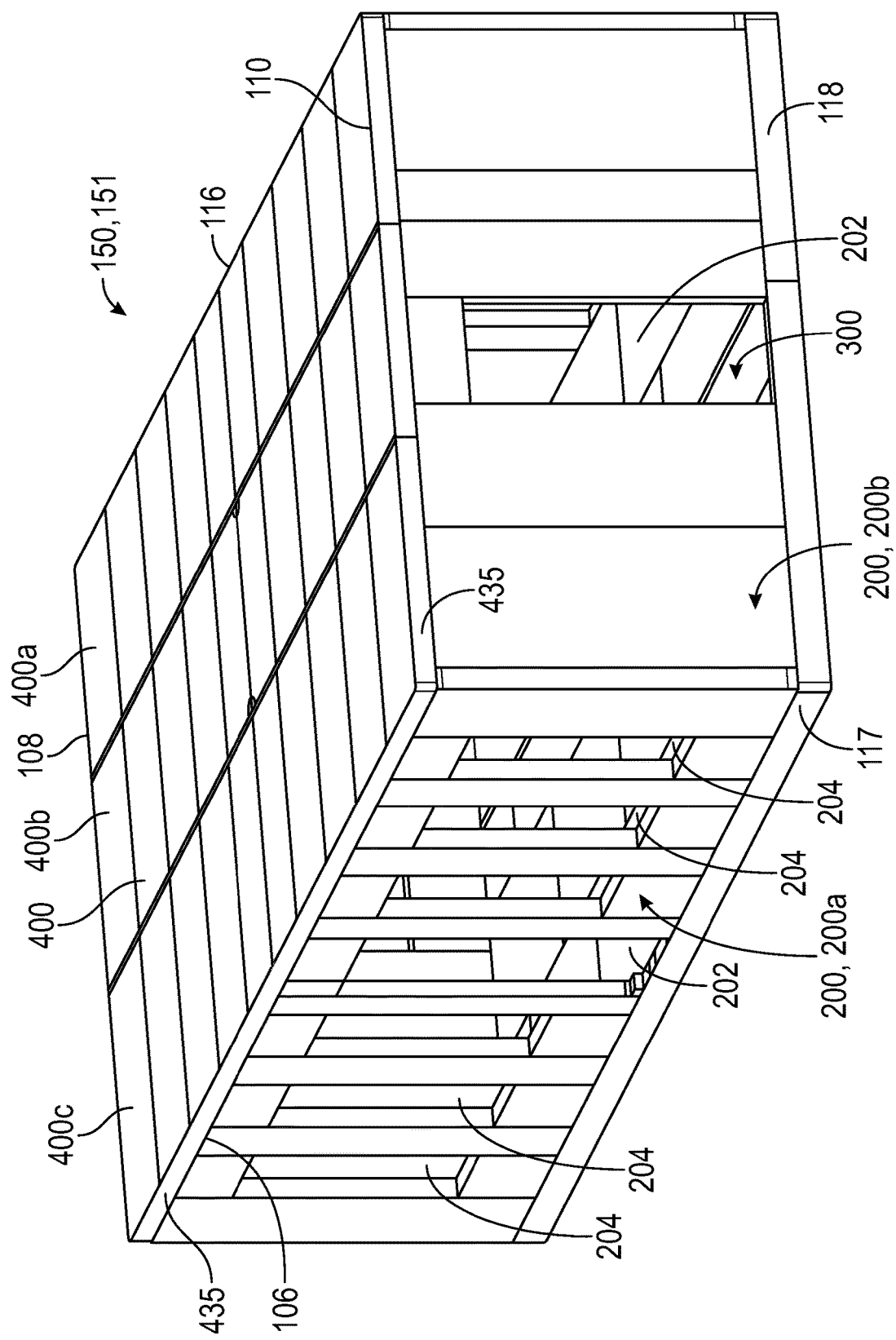
FIGS. 1A and 1B are perspective views of finished structures prepared in accordance with the present inventions.
Figure 1B:
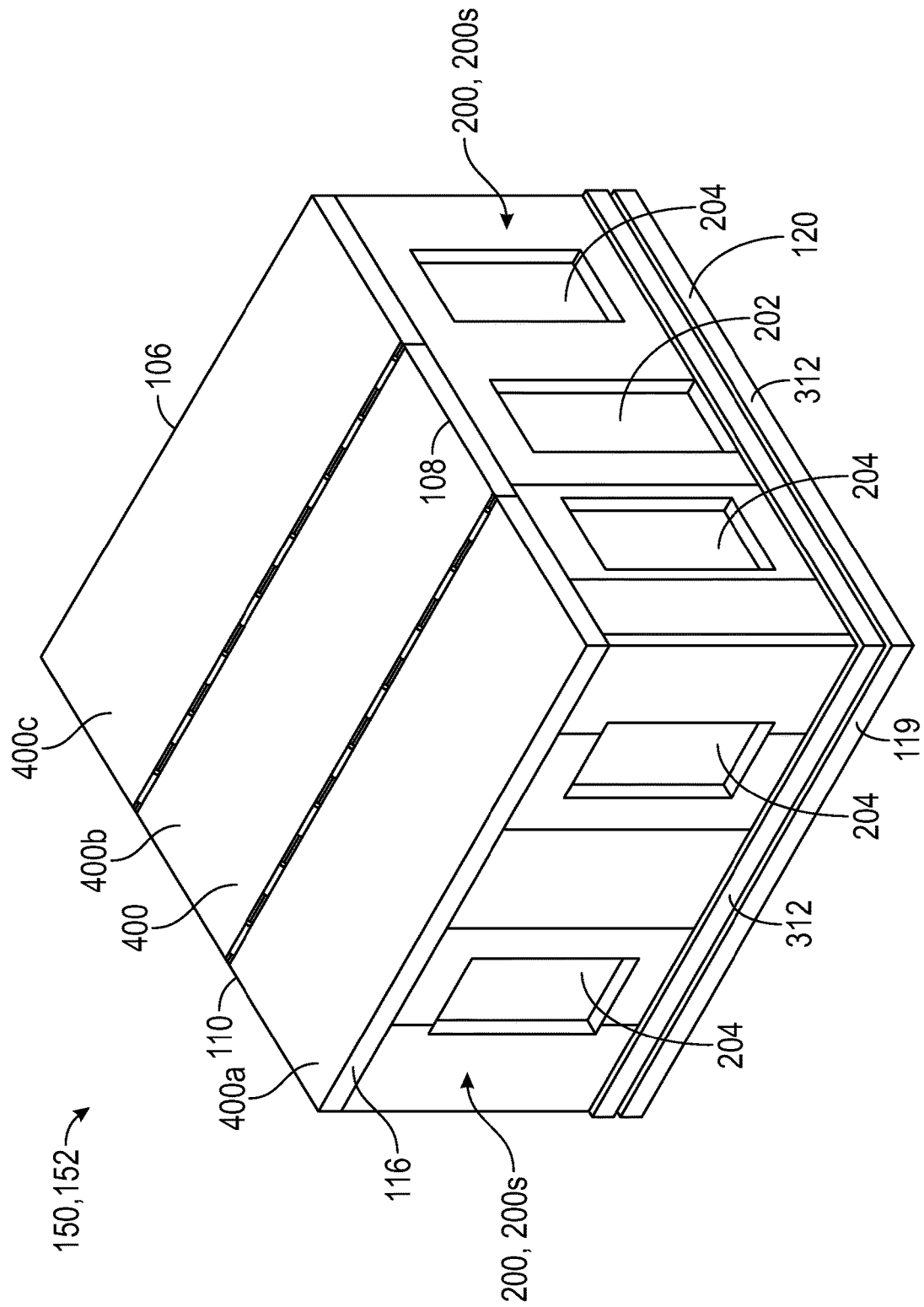

FIG. 1A depicts a finished structure 150 of a first type (sometimes referred to herein as type 1 structure 151) in accordance with the inventions disclosed herein, and FIG. 1B depicts a finished structure 150 of a second type (sometimes referred to herein as type 2 structure 152) in accordance with the inventions disclosed herein. Type 1 structure 151 is smaller than type 2 structure 152, but the inventions described herein are equally applicable to the fabrication and deployment of type 1 structure 151, type 2 structure 152, and to other structures of different dimensions as well. Accordingly, references herein to "structure 150" should be understood to generically denote type 1 structure 151 and type 2 structure 152 without distinction. Likewise, reference in this disclosure to the same numerically identified component among different embodiments indicates that such component is the same among such different embodiments.

Structure 150 as depicted in FIGS. 1A and 1B has a rectangular shape made of three types of generally planar and rectangular enclosure components 155, the three types of enclosure components 155 consisting of a wall component 200, a floor component 300, and a ceiling component 400. Structure 150 has one floor component 300, one ceiling component 400 and four wall components 200. As shown in FIGS. 1A and 1B, the perimeter of finished structure 150 is defined by first longitudinal edge 106, first transverse edge 108, second longitudinal edge 116 and second transverse edge 110.

Enclosure components 155 (wall component 200, floor component 300 and ceiling component 400) can be fabricated and dimensioned as described herein and positioned together to form a shipping module 100, shown end-on in FIGS. 3A and 3B, with FIG. 3A depicting a shipping module 100 for a type 1 structure 151 and FIG. 3B depicting a shipping module 100 for a type 2 structure 152. The enclosure components 155 are dimensioned so that the shipping module 100 is within U.S. federal highway dimensional restrictions. As a result, shipping module 100 can be transported over a limited access highway more easily, and with appropriate trailering equipment, transported without the need for oversize permits. Thus, the basic components of finished structure 150 can be manufactured in a factory, positioned together to form the shipping module 100, and the modules 100 can be transported to the desired site for the structure, where they can be readily assembled and customized, as described herein.

Enclosure Component Laminate Design

A laminate multi-layer design can be used to fabricate the enclosure components 155 of the present inventions. FIGS. 4A-4D depict four embodiments of that multi-layer design, in exploded cross-section, for an exemplary enclosure component 155.

First and Second Embodiments

Interior Sheathing Layer (282). In the first and second embodiments of the laminate multi-layer design, shown in FIGS. 4A and 4B respectively, the surface of enclosure component 155 that will face toward the interior of structure 150 is optionally provided with an interior sheathing layer 282. It is preferred that interior sheathing layer 282 be fabricated of relatively thick paper, of a weight comparable to that used as the exterior surface of drywall (marketed for example under the trademark Sheetrock®). Interior sheathing layer 282 preferably is unrolled from a continuous roll of paper (the paper roll optionally having a width approximating the width of enclosure component 155) to yield a seamless interior finish for enclosure component 155.

First Structural Layer (210). A first structural layer 210 is provided in the first embodiment depicted in FIG. 4A and in the second embodiment depicted in FIG. 4B. If used, the interior sheathing layer 282 is bonded to this first structural layer 210 with a suitable adhesive, preferably a polyurethane based construction adhesive. First structural layer 210 in the embodiments shown comprises a plurality of rectangular structural building panels 211 principally comprising an inorganic composition of relatively high strength, such as magnesium oxide (MgO). Suitable structural building panels 211 can be MgO boards approximately four feet (1.22 m) wide by approximately eight feet (2.44 m) long. In a specific implementation of the first embodiment of the multi-layer design of FIG. 4A, the thickness of those structural building panels 211 using magnesium oxide board can be approximately 0.5 inch (1.27 cm); as an alternative, a thickness of approximately 0.25 inch (0.64 cm) can be employed.

To form first structural layer 210, a number of generally rectangular structural building panels 211 are laid adjacent to each other to generally cover the full area of the intended enclosure component 155. For example, for the wall component 200a shown in FIG. 5A, structural building panels 211 are arranged horizontally and vertically adjacent each other in a checkerboard relationship to generally cover the full area of wall component 200a. As another exemplary arrangement, a number of structural building panels 211 of sufficient length can be vertically positioned side-by-side to generally cover the full area of a wall component 200.

Figure 4A:
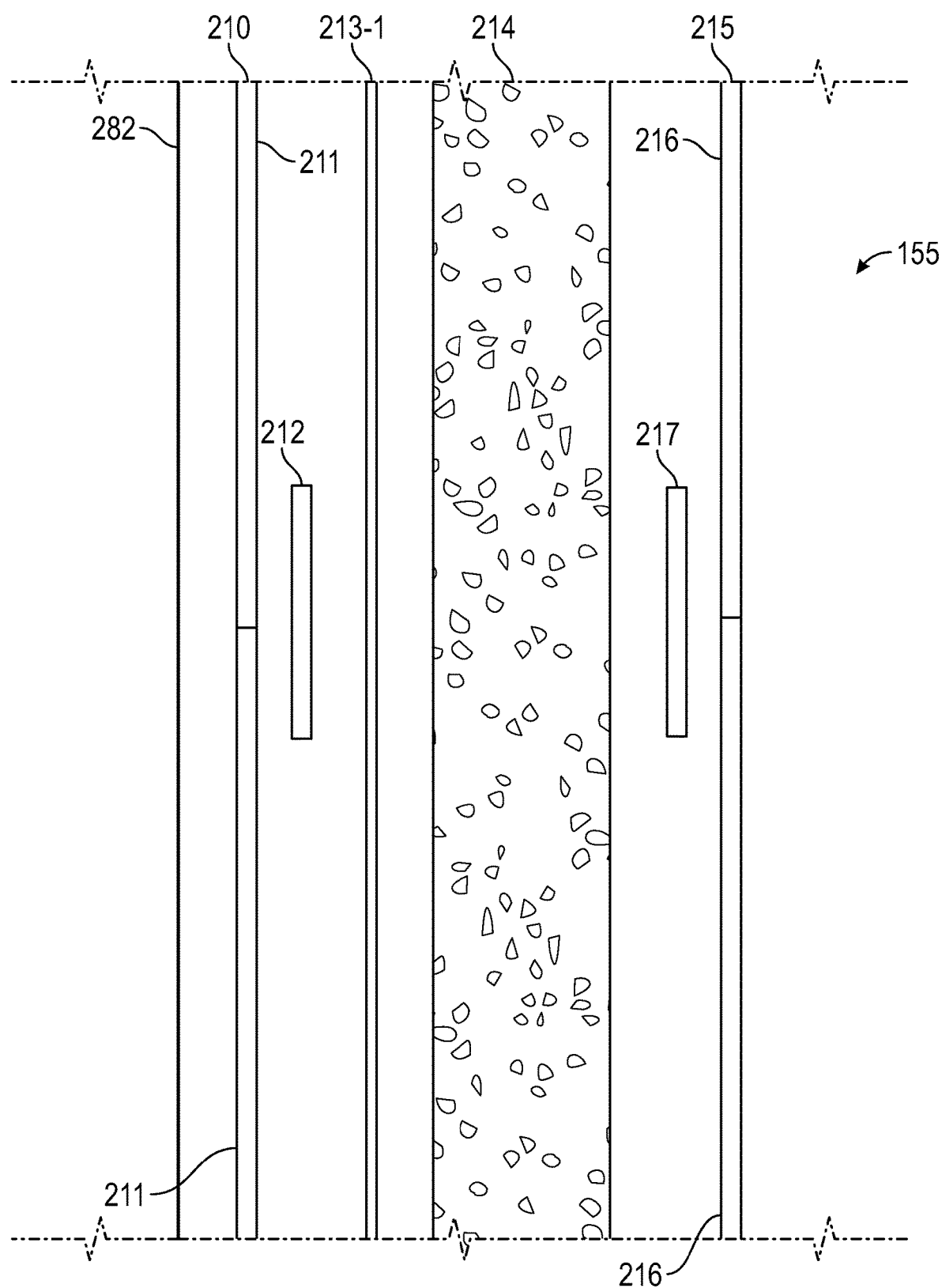
FIGS. 4A, 4B, 4C and 4D are exploded cross-sectional views of four embodiments of laminate multi-layer constructions for use in the enclosure components of the present inventions.
Figure 4B:
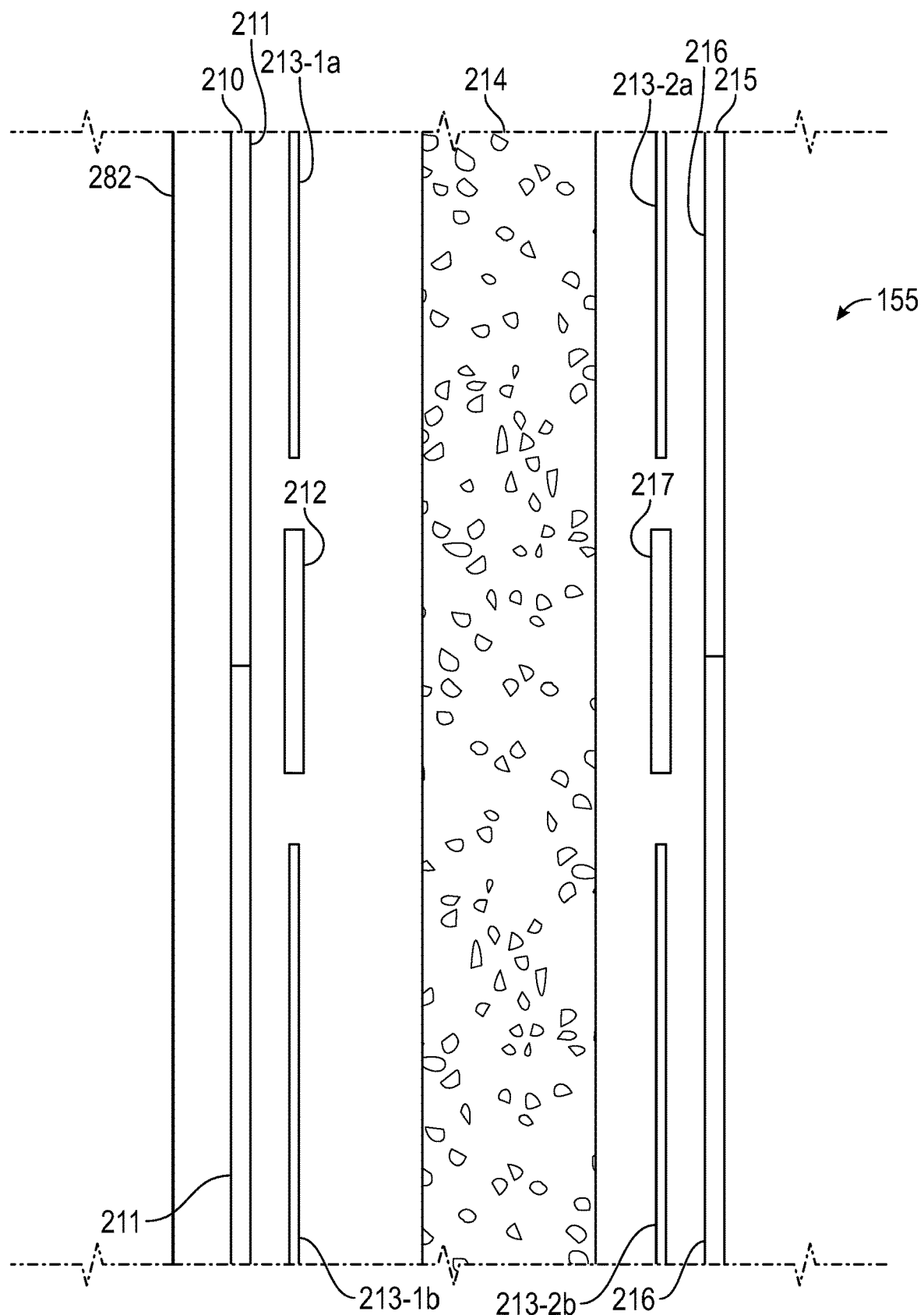

First structural layer 210 in the first and second embodiments, respectively shown in FIGS. 4A and 4B, additionally comprises multiple binding strips 212, made for example of magnesium oxide board, laid both horizontally and/or vertically as appropriate. In particular, binding strips 212 are positioned over the linear junctions between adjacent panels 211, and then are fastened to the regions of those panels bordering those junctions, using for example a suitable adhesive, preferably a polyurethane based construction adhesive, to form a lap joint between the adjacent building panels 211, thereby bonding together the panels 211 of first structural layer 210 to form a single unit. Binding strips 212 of magnesium oxide board can be for example approximately six inches (15.2 cm) wide and 0.25 inch (0.635 cm) or 0.5 inch (1.27 cm) thick.

First Strengthening Layer (213-1). As shown in the first and second embodiments depicted in FIGS. 4A and 4B respectively, there is next provided a first strengthening layer 213-1, made of woven fiber such as woven fiberglass. In the first embodiment, shown in FIG. 4A, first strengthening layer 213-1 preferably is unrolled from a continuous roll of mat (the mat roll optionally having a width approximating the width of enclosure component 155) to yield a seamless interior layer. In the second embodiment, shown in FIG. 4B, first strengthening 213-1 comprises multiple separate fiber layer segments, as exemplified by segments 213-1a and 213-1b shown in FIG. 4B, which are positioned between binding strips 212.

Foam Panels (214). Referring again to FIGS. 4A and 4B, there is next provided in the first and second embodiments a plurality of generally planar rectangular foam panels 214 collectively presenting a first face and a second opposing face. Foam panels 214 are made for example of expanded polystyrene (EPS) or polyurethane foam. A number of these foam panels 214 are laid adjacent to each other to generally cover the full area of the intended enclosure component 155. For example, for the wall component 200a shown in FIG. 5B, foam panels 214 are arranged horizontally and vertically adjacent each other in a checkerboard relationship to generally cover the full area of wall component 200a. As another exemplary arrangement, a number of foam panels 214 of sufficient length can be vertically positioned side-by-side to generally cover the full area of a wall component 200.

It is preferred that the seams between adjacent foam panels 214 not overlay or coincide with the seams between the structural building panels 211 of first structural layer 210, in reference to the direction across the thickness of the enclosure component 155. Rather, it is preferred that the seams between adjacent foam panels 214 be offset a distance from the seams between adjacent structural building panels 211 of first structural layer 210. For example, for foam panels 214 vertically positioned side-by-side and structural building panels 211 vertically positioned side-by-side, the seams between adjacent foam panels can be positioned at or as near the mid-line (the middle dividing line) of structural building panels 211 as design, manufacturing and other considerations permit. Correspondingly, for foam panels 214 arranged in a checkerboard relationship and building panels 211 arranged in a checkerboard relationship, each corner where four foam panels 214 meet can be positioned at or as near the center of a structural building panel 211 as design, manufacturing and other considerations permit.

First strengthening layer 213-1 preferably is sandwiched between and fastened to both first structural layer 210 and to the first face of foam panels 214 using a suitable adhesive, preferably a polyurethane based construction adhesive. If the woven fiber of first strengthening layer 213-1 has a relatively open weave, only one adhesive spread is required during manufacture to bond together the layers 210, 213-1 and 214 into a bonded laminate structure.

Adjacent foam panels 214 optionally can be fastened to each other with a suitable adhesive applied between abutting panels, preferably a polyurethane based construction adhesive.

Second Strengthening Layer (213-2). In the first embodiment of the laminate multi-layer design shown in FIG. 4A, there is a strengthening layer of woven fiber, first strengthening layer 213-1, on one face of foam panels 214 only. In the second embodiment of the laminate multi-layer design, shown in FIG. 4B, there is a second strengthening layer 213-2, made of woven fiber such as woven fiberglass, on the second opposing face of foam panels 214. Second strengthening layer 213-2 can be continuous, like first strengthening layer 213-1 shown in FIG. 4A, or can comprise multiple separate fiber layer segments, as exemplified by segments 213-2a and 213-2b shown in FIG. 4B, which are positioned between binding strips 217, described further below.

Second Structural Layer (215). In the first embodiment of the laminate multi-layer design shown in FIG. 4A, there is provided a second structural layer 215, which is positioned on the second opposing face of foam panels 214 (the face distal from first structural layer 210). In the second embodiment of the laminate multi-layer design, shown in FIG. 4B, there is also provided a second structural layer 215, although in this second embodiment the second strengthening layer 213-2 is sandwiched between the second opposing face of foam panels 214 and second structural layer 215. Second structural layer 215 comprises a plurality of rectangular structural building panels 216, each principally comprising an inorganic composition of relatively high strength, such as magnesium oxide. Suitable building panels 216 can be magnesium oxide boards approximately four feet (1.22 m) wide by eight feet (2.44 m) long. In an exemplary embodiment of second structural layer 215, the thickness of those structural building panels 216 using magnesium oxide board can approximately 0.5 inch (1.27 cm) as an alternative, a thickness of approximately 0.25 inch (0.64 cm) can be employed.

To form second structural layer 215, a number of rectangular structural building panels 216 are laid adjacent to each other to generally cover the full area of the intended enclosure component 155. For example, for the wall component 200a shown in FIG. 5B, structural building panels 216 are arranged horizontally and vertically adjacent each other in a checkerboard relationship to generally cover the full area of wall component 200a. As another exemplary arrangement, a number of structural building panels 216 of sufficient length can be vertically positioned side-by-side to generally cover the full area of a wall component 200.

As is the case for first structural layer 210, it is preferred that the seams between adjacent foam panels 214 not overlay or coincide with the seams between the structural building panels 216 of second structural layer 215 in the direction across the thickness of the enclosure component 155. Rather, it is preferred that the seams between adjacent foam panels 214 be offset a distance from the seams between adjacent structural building panels 216 of second structural layer 215. For example, for foam panels 214 vertically positioned side-by-side and structural building panels 216 vertically positioned side-by-side, the seams between adjacent foam panels 214 can be positioned at or as near the mid-line of structural building panels 216 as design, manufacturing and other considerations permit. Correspondingly, for foam panels 214 arranged in a checkerboard relationship and structural building panels 216 arranged in a checkerboard relationship, each corner where four foam panels 214 meet can be positioned at or as near the center of a structural building panel 216 as design, manufacturing and other considerations permit. On the other hand, the seams between the structural building panels 211 of first structural layer 210 can coincide without preference in the direction across the thickness of the enclosure component 155 with the seams of structural building panels 216 of second structural layer 215.

The second structural layer 215 in the first and second embodiments, shown in FIGS. 4A and 4B respectively, additionally comprises multiple binding strips 217, made for example of magnesium oxide board, positioned between building panels 216 and foam panels 214. Binding strips 217 are positioned over the linear junctions between adjacent panels 216, and then are fastened to the regions of those panels bordering those junctions, using for example a suitable adhesive, preferably a polyurethane based construction adhesive, to form a lap joint between the adjacent building panels 216, thereby bonding together the panels 211 of first structural layer 210 to form a single unit. Binding strips 217 of magnesium oxide board can be for example approximately six inches (15.2 cm) wide and 0.25 inches (0.635 cm) or 0.5 inch (1.27 cm) thick.

If first strengthening layer 213-1 and/or second strengthening layer 213-2 are formed from a continuous roll, then foam panels 214 can be provided with suitable recesses (not shown) to accommodate such local thickness variations of the combination of layer 213-1/binding strips 212 and/or layer 213-2/binding strips 217 as may arise in the regions proximate the binding strips. If first strengthening layer 213-1 and/or second strengthening layer 213-2 are formed from separate segments, then foam panels 214 can be provided with suitable recesses (not shown) to receive binding strips 212 and/or 217.

In the first embodiment shown in FIG. 4A, second structural layer 215 is fastened to foam panels 214 using for example a suitable adhesive, preferably a polyurethane based construction adhesive. In the second embodiment shown in FIG. 4B, second strengthening layer 213-2 preferably is fastened to both second structural layer 215 and to foam panels 214 using for example a suitable adhesive, preferably a polyurethane based construction adhesive. If first strengthening layer 213-2 has a woven fiber having a relatively open weave, only one adhesive spread is required during manufacture to bond together the layers 214, 213-2 and 215 into a bonded laminate structure.

Figure 5A:
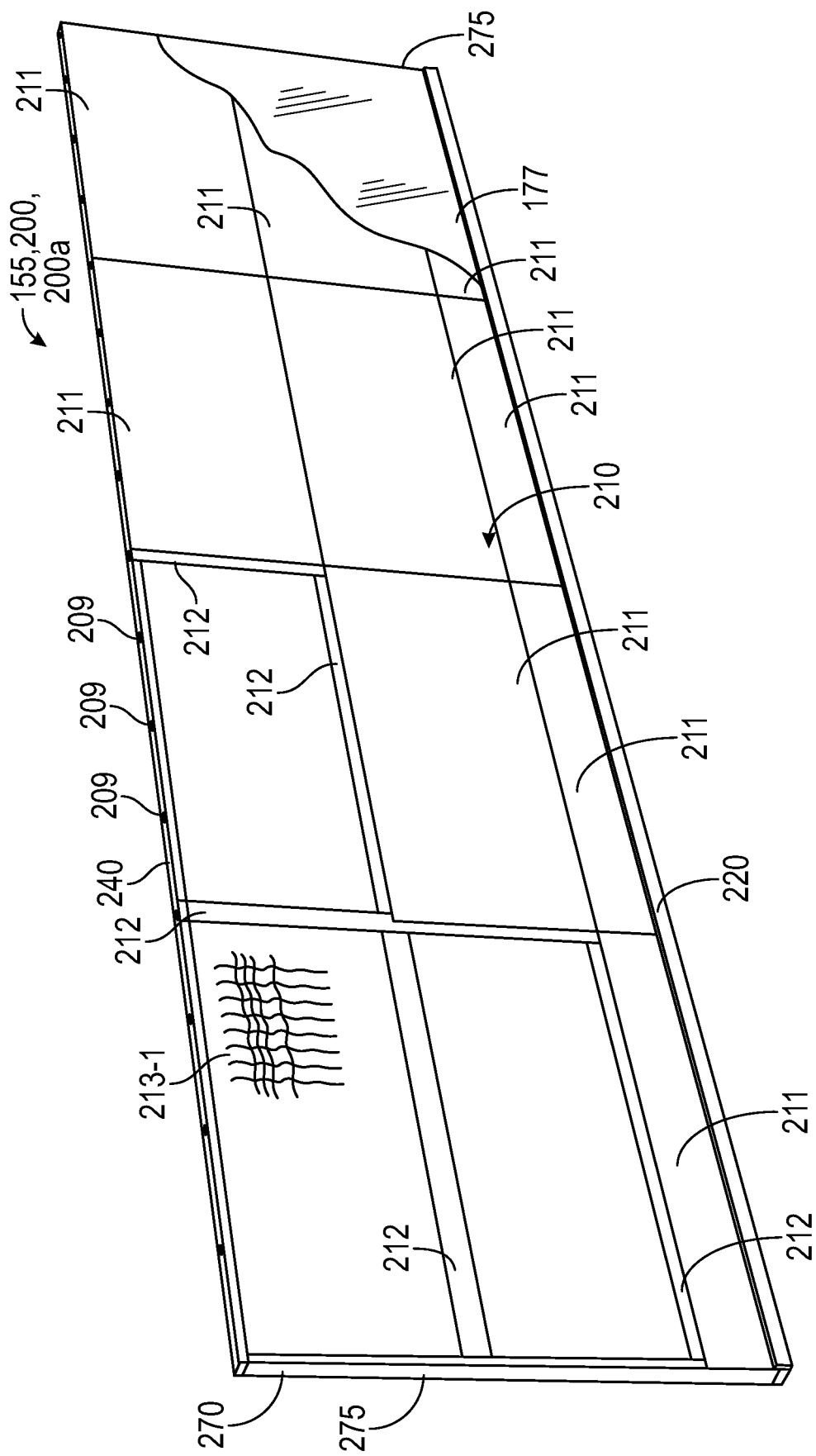
FIG. 5A is a cutaway perspective interior view of a wall component in accordance with the present inventions.
Figure 5B:
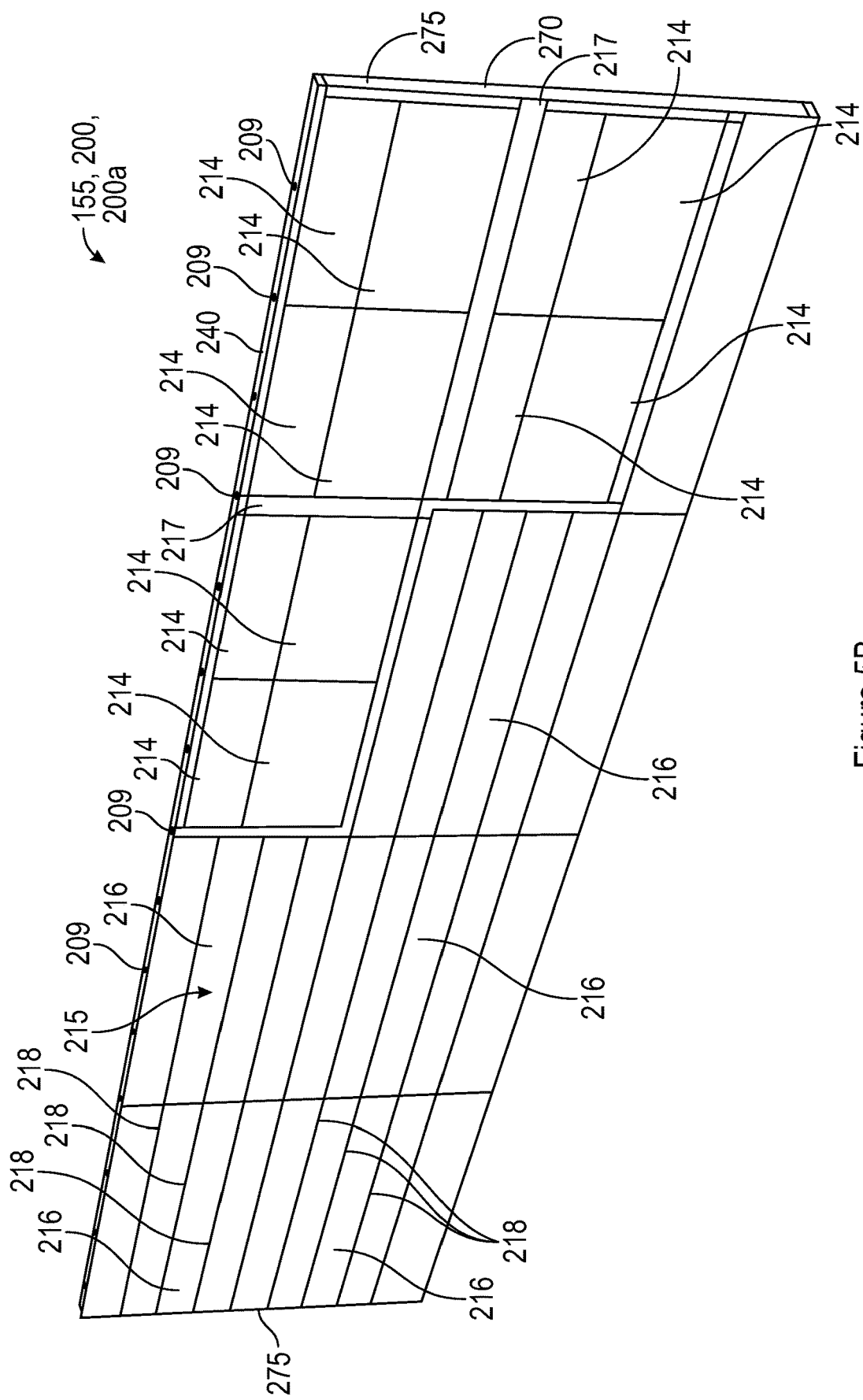
FIG. 5B is a cutaway perspective exterior view of a wall component in accordance with the present inventions.

In the embodiment of wall component 200 shown in FIG. 5B, the exterior of the structural building panels 216 of second structural layer 215 are provided with grooves 218 for aesthetic reasons, particularly to better conceal the presence of the seams between adjacent panels 216. Optionally, the exterior of panels 216 can be covered with additional protective material unrolled from a continuous roll.

Strengthening layer 213-1 and/or strengthening layer 213-2 can be omitted in the absence of tensile loading in the applicable region. Further, although the interior sheathing layer 282 is shown bonded to first structural layer 210, it can with equal facility be bonded to second structural layer 215, where that structural layer faces the interior, inhabited portion of the structure. Interior sheathing layer 282 can also be omitted where not desired.

Third and Fourth Embodiments

Figure 4C:
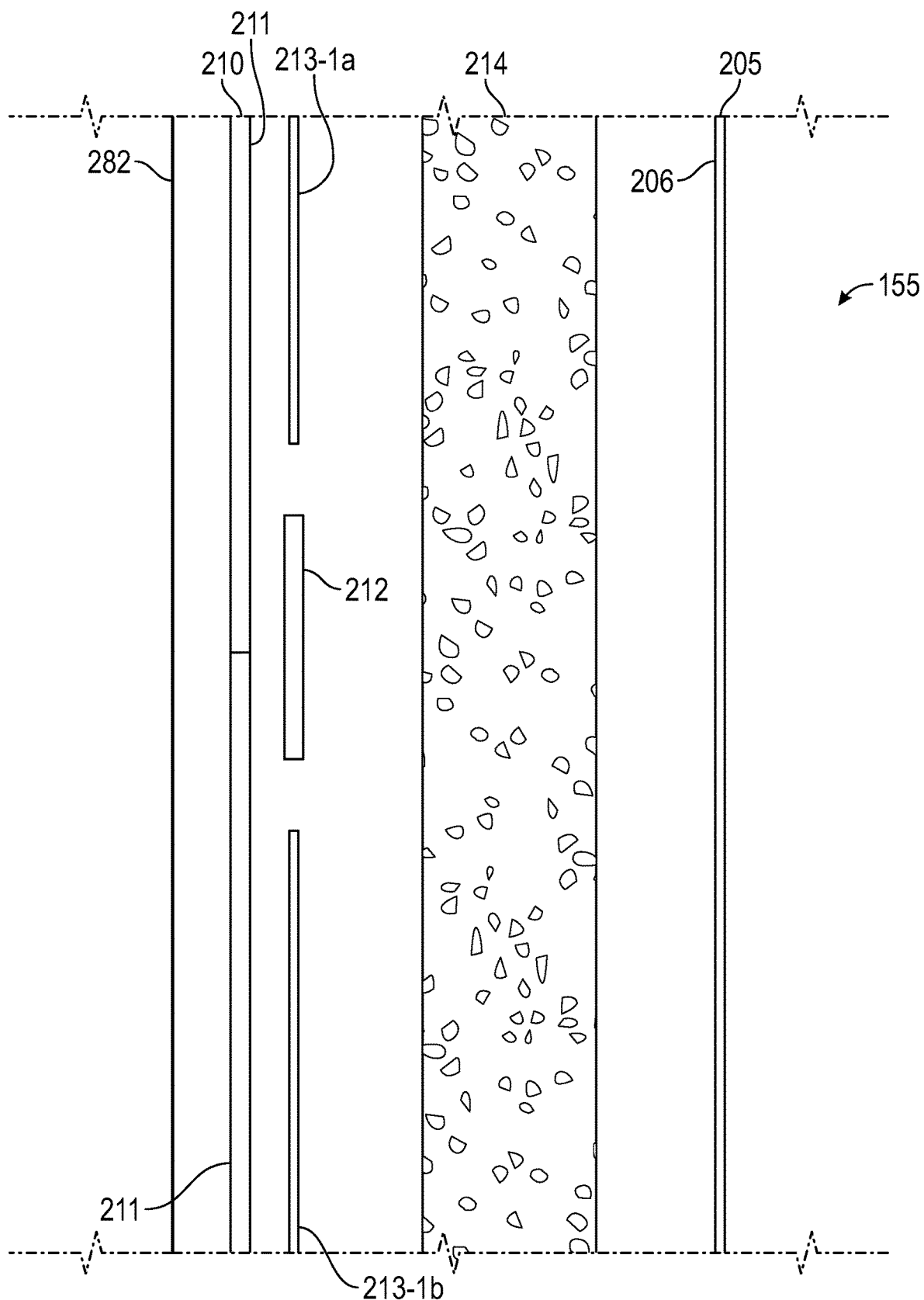

A third embodiment of the laminate multi-layer design is shown in FIG. 4C. As compared to the second embodiment shown in FIG. 4B, the third embodiment of FIG. 4C has a sheet metal layer 205 in lieu of second structural layer 215, but is otherwise identical in design to the second embodiment shown in FIG. 4B. Sheet metal layer 205, which can be steel or aluminum for example, is made from a plurality of generally planar rectangular metal sheets 206 positioned adjacent to each other to generally cover the full area of the intended enclosure component 155, and joined to each other, such as by riveting or welding. Following joining, the joined metal sheets 206 of sheet metal layer 205 are fastened with a suitable adhesive spread to the second opposing face of foam panels 214 (the face of foam panels 214 distal from structural layer 210).

It is preferred that the seams between adjacent foam panels 214 not overlay or coincide with the seams in the joined metal sheets 206 of sheet metal layer 205 in the direction across the thickness of the enclosure component 155. Rather, it is preferred that the seams between adjacent foam panels 214 be offset a distance from the seams in the joined metal sheets 206 of sheet metal layer 205. For example, for foam panels 214 vertically positioned side-by-side and joined metal sheets 206 vertically positioned side-by-side, the seams between adjacent foam panels can be positioned at or as near the mid-line (the middle dividing line) of joined metal sheets 206 as design, manufacturing and other considerations permit.

In this third embodiment, the metal sheets 206 of sheet metal layer 205 can be made of steel, optionally given a protective and/or decorative surface treatment, each having for example a thickness in the range of approximately 26 to 20 gauge (0.0179 inch (0.454 mm) to 0.0478 inch (1.214 mm)). Use of sheet metal layer 205 provides increased tensile strength as compared for example to a second structural layer 215 comprising structural building panels 216, particularly magnesium oxide boards. At the same time, the laminate multi-layer design shown in FIG. 4C exhibits substantial compressive strength in the region of a first structural layer 210 comprising structural building panels 211, particularly magnesium oxide boards.

Figure 4D:
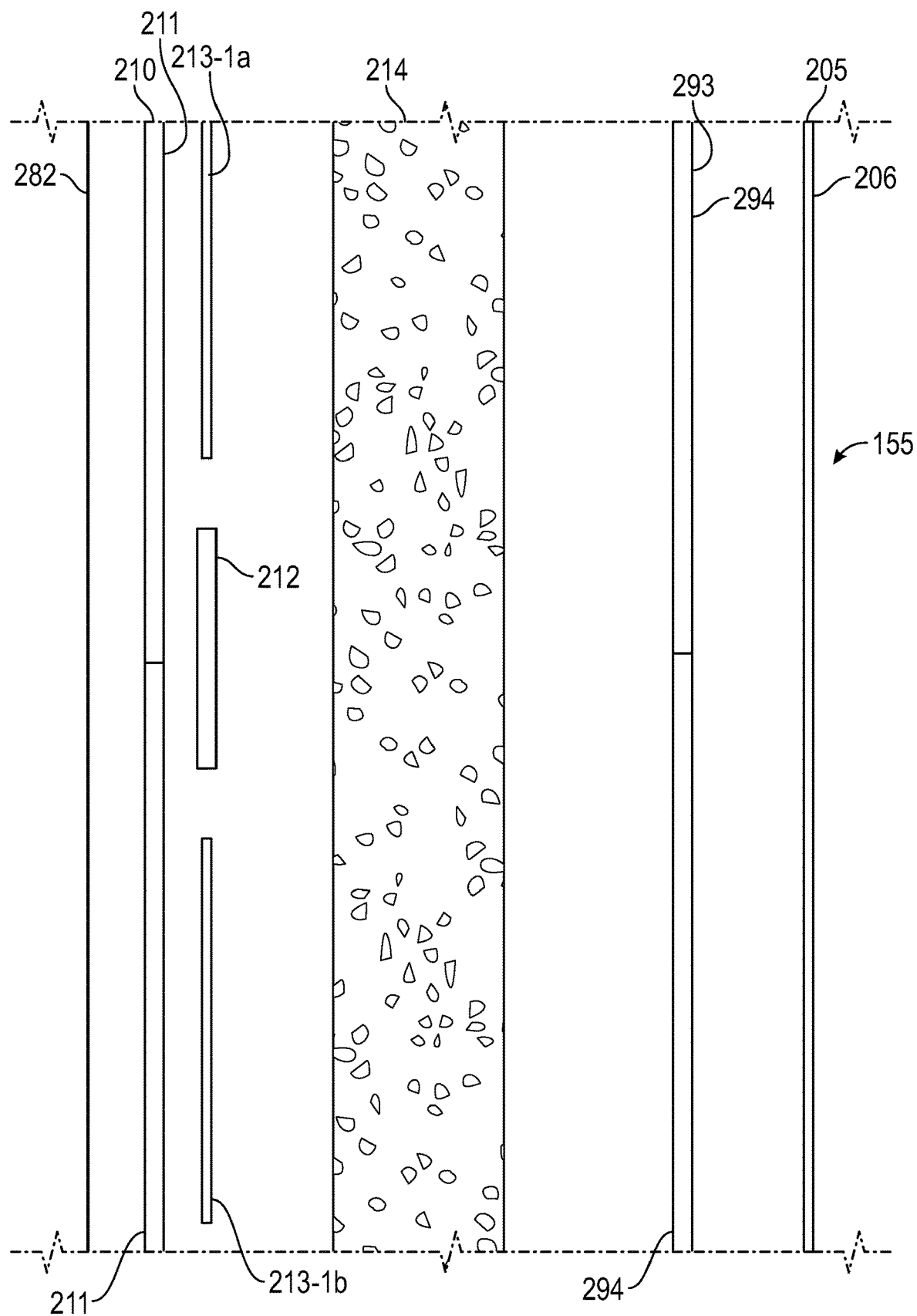

A fourth embodiment of the laminate multi-layer design is shown in FIG. 4D. As compared to the third embodiment shown in FIG. 4C, the fourth embodiment of FIG. 4D includes a protective layer 293 interposed between foam panels 214 and sheet metal layer 205, but is otherwise identical in design to the third embodiment shown in FIG. 4C. Protective layer 293 comprises a plurality of generally rectangular protective panels 294 arranged adjacent to each other to generally cover the full area of the intended enclosure component 155. The protective panels 294 of protective layer 293 can principally comprise a fire-resistant inorganic composition, such as magnesium oxide (MgO) or calcium sulfate dihydrate (also known as drywall and marketed for example under the trademark Sheetrock®). Suitable protective panels 294 for protective layer 293 can be magnesium oxide boards approximately four feet (1.22 m) wide by approximately eight feet (2.44 m) long.

The protective building panels 294 of protective layer 293 are bonded to both foam panels 214 and sheet metal layer 205 with a suitable adhesive spread applied between protective layer 293 and the second opposing face of foam panels 214, and between protective layer 293 and sheet metal layer 205. A suitable thickness for protective building panels 294 of protective layer 293, using magnesium oxide boards, can be 0.125 inch (3.18 mm). A principal function of protective layer 293 in the fourth embodiment of the laminated multi-layer construction shown in FIG. 4D is to impart fire resistance.

Enclosure Component Exterior Edge Reinforcement

The exterior edges defining the perimeter of each enclosure component 155 can be provided with edge reinforcement, as desired. Exterior edge reinforcement can protect foam panel material that would otherwise be exposed at the exterior edges of enclosure components 155. Exterior edge reinforcement can also serve other functions, as described below. Exterior edge reinforcement can be fabricated from one or more of laminated strand lumber board, wooden board, C-channel extruded aluminum or steel, or the like, and is generally secured to the exterior edges of enclosure component 155 with fasteners, such as screw or nail fasteners, and/or adhesive.

Enclosure Component Partitioning

Enclosure components 155 in certain instances are partitioned into enclosure component portions to facilitate forming a compact shipping module 100. In those instances where an enclosure component 155 is partitioned into enclosure component portions, any exterior edge reinforcement on the exterior edges defining the perimeter of the enclosure component is segmented as necessary between or among the portions.

Enclosure Component Interior Edge Reinforcement

An enclosure component 155 partitioned into enclosure component portions will have interior edges. There will be two adjacent interior edges for each adjacent pair of enclosure component portions. Such interior edges can be provided with interior edge reinforcement. Similar to exterior edge reinforcement, such interior edge reinforcement can protect foam panel material that would otherwise be exposed at the interior edges of enclosure components 155. Interior edge reinforcement can also serve other functions, as described below. Interior edge reinforcement can be fabricated from one or more of laminated strand lumber board, wooden board, C-channel extruded aluminum or steel, or the like, and is generally secured to the interior edges of enclosure component 155 with fasteners, such as screw or nail fasteners, and/or adhesive.

Further design details for finished structure 150, wall component 200, floor component 300, and ceiling component 400 are provided in the sections following.

Wall Component (200)

Typically, a finished structure 150 will utilize four wall components 200, with each wall component 200 corresponding to an entire wall of structure 150. Wall component 200 has a generally rectangular perimeter. The height and length of wall components 200 can vary in accordance with design preference, subject to the dimensional restrictions applicable to transport, described above. In this disclosure, where structure 150 is fashioned with two opposing sides longer than the other two sides (as is the case with type 1 structure 151), the two wall components 200 positioned along first and second longitudinal edges 106 and 116 are sometimes referred to as long wall components, with each being denominated 200*a*, and the two wall components 200 positioned along first and second transverse edges 108 and 110 are sometimes referred to as short wall components, with each being denominated 200*b*. Where structure 150 is fashioned with all sides of approximately equal length (as is the case with type 2 structure 152), the four wall components 200 are sometimes each denominated 200*s*. The basic structure and design of wall component 200 is the same for both type 1 structure 151 and type 2 structure 152, and are applicable to structures 150 generally.

Figure 2A:
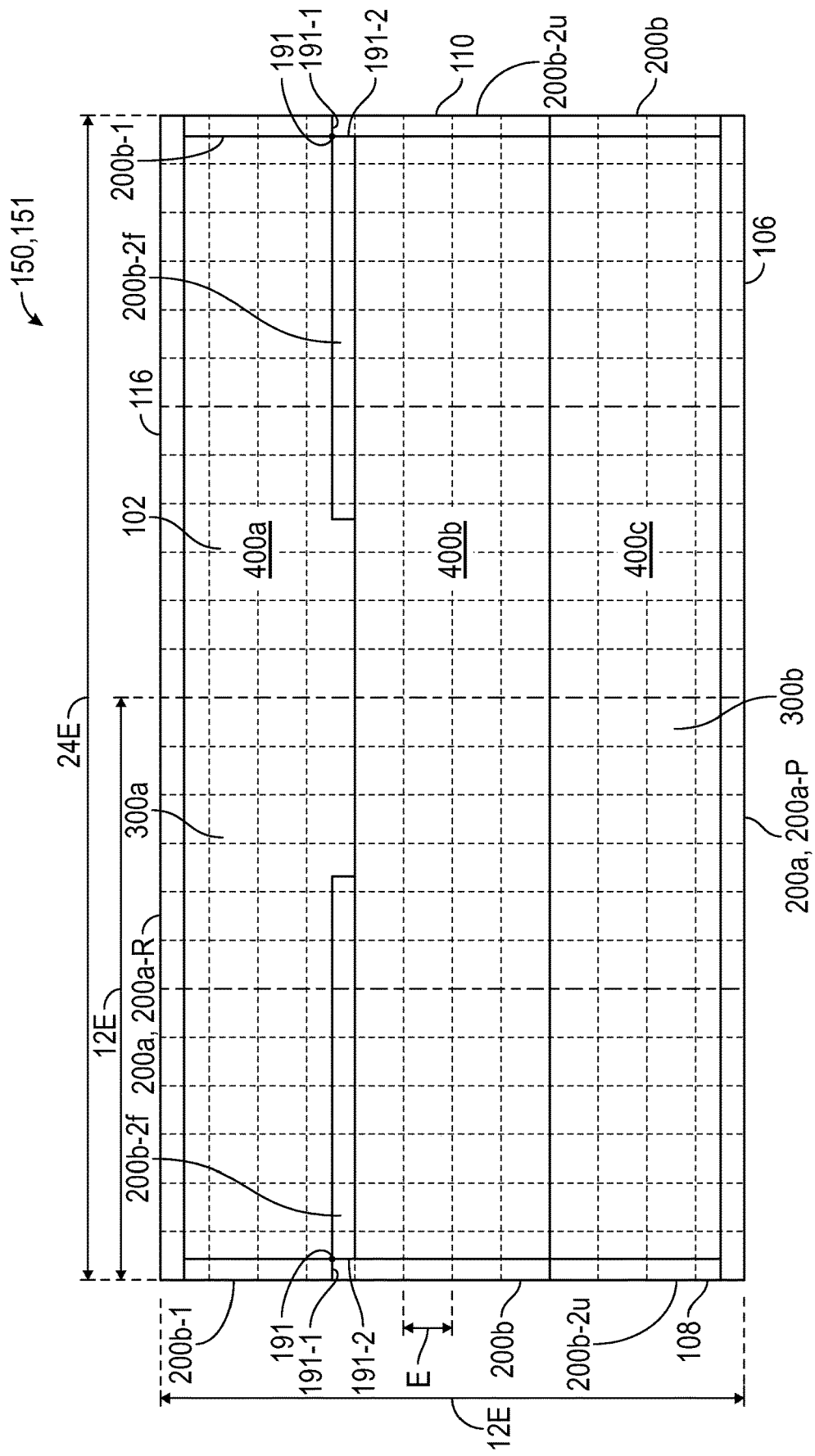
FIGS. 2A and 2B are top schematic views of finished structures prepared in accordance with the present inventions.

In a particular embodiment of the type 1 structure 151 depicted in FIGS. 1A and 2A, long wall component 200*a* is approximately thirty-nine feet (11.89 m) in length, and short wall component 200*b* is approximately 19.5 feet (5.94 m) in length; thus long wall components 200*a* positioned along first and second longitudinal edges 106 and 116 are approximately twice the length of short wall components 200*b* positioned along first and second transverse edges 108 and 110. Long wall components 200*a* and short wall components 200*b* are approximately 9.5 feet (2.9 m) in height and approximately six inches (15.24 cm) in thickness.

Figure 2B:
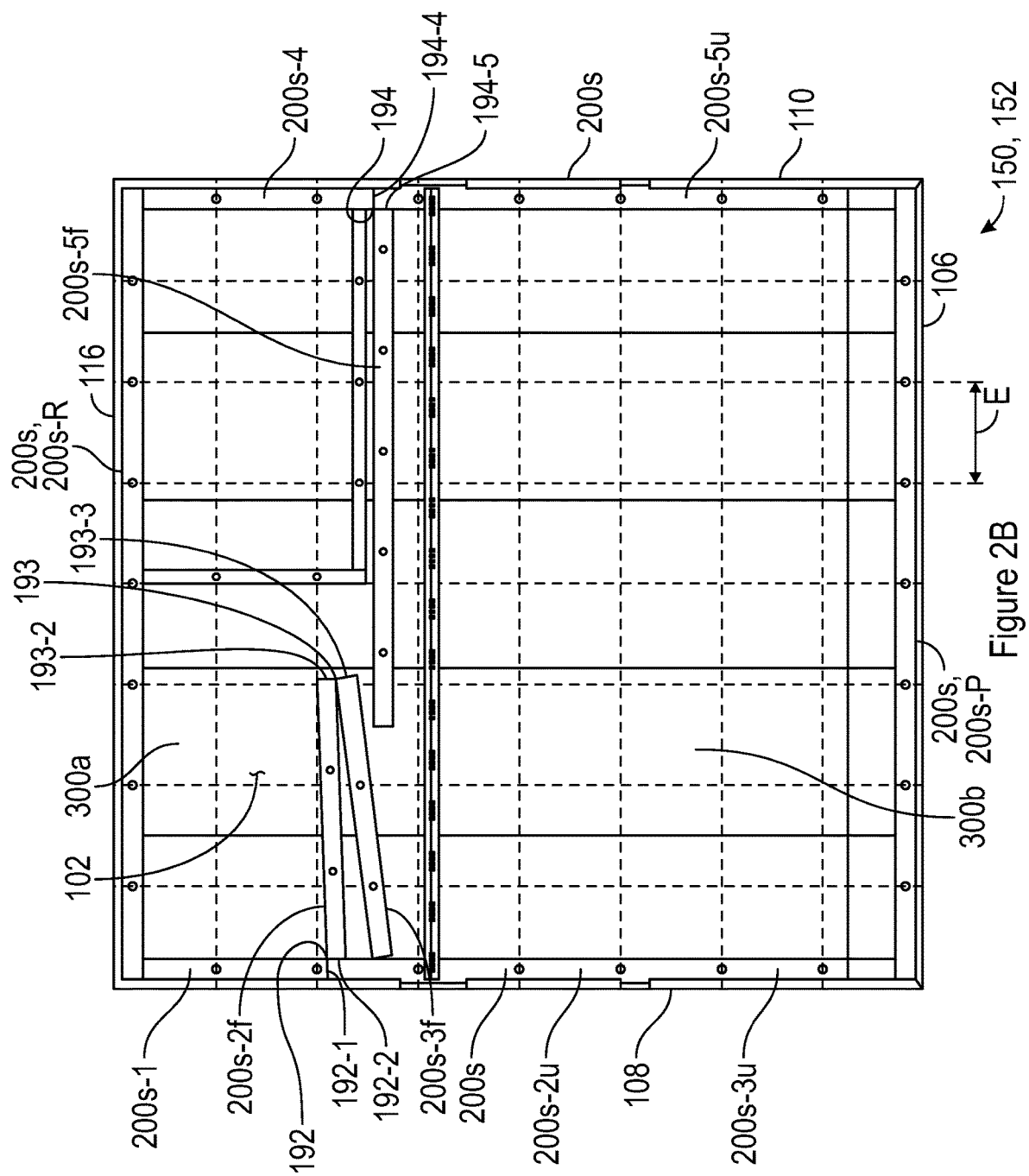

As indicated above, the type 2 structure 152 shown in FIGS. 1B and 2B has wall components 200, 200*s* of equal length (each denominated 200*s*)—i.e., type 2 structure 152 generally has a square shape. Thus in the case of type 2 structure 152, the first and second longitudinal edges 106 and 116, and the first and second transverse edges 108 and 110, are all of equal length. In a particular embodiment of the type 2 structure 152 shown in FIGS. 1B and 2B, wall components 200, 200*s* can be approximately 19 feet (5.79 m) in length, approximately 9.45 feet (2.88 m) in height and approximately six inches (15.24 cm) in thickness.

As indicated above, wall components 200 of the present inventions preferably utilize one of the laminate multi-layer designs described above in reference to FIGS. 4A-4D. For example, long wall component 200*a*, shown in FIGS. 5A and 5B, can utilize the second embodiment of the laminate multi-layer designs described with reference to FIG. 4B. The particular embodiment of wall component 200*s* of the type 2 structure 152 shown in FIGS. 1B and 2B referenced above can utilize the second multi-layer design (FIG. 4B) with 0.25 inch (0.635 cm) thick MgO board for structural building panels 211 of first structural layer 210 and also for structural building panels 216 of second structural layer 211, with binding strips 211, 217 of 0.25 inch (0.635 cm) thick MgO board six inches (15.24 cm) wide. The foam panels 214 can be 5.5 inches (13.97 cm) thick, yielding a wall component 200 approximately six inches (15.24 cm) thick.

The perimeter of each wall component 200 is generally provided with exterior edge reinforcement. As exemplified by long wall component 200*a* shown in FIG. 5A, the exterior edge reinforcement for wall component 200 is a floor plate 220 along the bottom horizontal edge, a ceiling plate 240 along the top horizontal edge and two end pieces 270 respectively fastened at each vertical edge 275 of wall component 200. In the case of a wall component 200, exterior edge reinforcement provides regions for fastening like regions of abutting wall components 200, ceiling component 400 and floor component 300, in addition to in addition to protecting the exterior edges of foam panel material.

The exterior edge reinforcement for wall component 200 provided by floor plate 220, ceiling plate 240, and end pieces 270 can be fabricated from one or more of laminated strand lumber board, wooden board, C-channel extruded aluminum or steel, or the like. Alternatively, appropriate enclosure component perimeter structures of a type disclosed in U.S. Nonprovisional patent application Ser. No. 16/786,202 entitled "Enclosure Component Perimeter Structures," having the same inventors and filed on the same date as the subject application, can be employed in addition to or in substitution for exterior edge reinforcement of the type just described for wall component 200. The contents of that U.S. Nonprovisional patent application Ser. No. 16/786,202 entitled "Enclosure Component Perimeter Structures," having the same inventors and filed on the same date as the subject application, are incorporated by reference as if fully set forth herein, particularly including the enclosure component perimeter structures described for example at paragraphs 110-124 and in FIGS. 10-12 thereof. Notably, those enclosure component perimeter structures can also perform a sealing function, to inhibit water ingress and environmental exposure.

Wall Partitioning

Partitioned Wall Portions of Type 1 Structure (151). Referring to FIG. 2A, the two short wall components 200*b* of type 1 structure 151 each comprises first wall portion 200*b*-1 and second wall portion 200*b*-2. Each of wall portions 200*b*-1 and 200*b*-2 is a generally rectangular planar structure. The interior vertical edge 191-1 of each of wall portions 200*b*-1 is proximate to a respective interior vertical edge 191-2 of wall portion 200*b*-2. Interior edge reinforcement can be provided at any one or more of vertical edges 191-1 and 191-2, examples of which include laminated strand lumber board, wooden board, C-channel extruded aluminum or steel.

Referring again to FIG. 2A, the two first wall portions 200*b*-1 are located at fixed positions, opposite each other on floor portion 300*a*, proximate first and second transverse edges 108, 110 of finished structure 150. Each first wall portion 200*b*-1 is joined to a second wall portion 200*b*-2 with a hinge structure. These hinge structures permit second wall portions 200*b*-2 to pivot about vertical axes 191 between a folded position and an unfolded position. FIG. 2A depicts second portions 200*b*-2 both in their unfolded positions, where they are denominated 200*b*-2*u*, and in their inwardly folded positions, where they are denominated 200*b*-2*f*. When second portions 200*b*-2 are in their folded positions, they facilitate forming a compact shipping module. When second portions 200*b*-2 are in their unfolded positions, with first portions 200*b*-1 they form the short wall components 200*b* of type 1 structure 151 shown in FIG. 2A.

Partitioned Wall Portions of Type 2 Structure (152). Referring to FIG. 2B, type 2 structure 152 has two opposing wall components 200*s*, where one of the opposing wall components 200*s* comprises first wall portion 200*s*-1, second wall portion 200*s*-2 and third wall portion 200*s*-3, and the other of the opposing wall components 200*s* comprises fourth wall portion 200*s*-4 and fifth wall portion 200*s*-5. Each of wall portions 200*s*-1, 200*s*-2, 200*s*-3, 200*s*-4 and 200*s*-5 has a generally rectangular planar structure. As shown in FIG. 2B, the interior vertical edge 192-1 of wall portion 200*s*-1 is proximate to a respective interior vertical edge 192-2 of wall portion 200*s*-2, and the interior vertical edge 193-2 of wall portion 200*s*-2 is proximate a respective interior vertical wall edge 193-3 of wall portion 200*s*-3. Also as shown in FIG. 2B, the interior vertical edge 194-4 of wall portion 200*s*-4 is proximate to a respective interior vertical edge 194-5 of wall portion 200*s*-5. Interior edge reinforcement can be provided at any one or more of vertical edges 192-1, 192-2, 193-2, 193-3, 194-4 and 194-5, examples of which include laminated strand lumber board, wooden board, C-channel extruded aluminum or steel.

Referring again to FIG. 2B, first wall portion 200*s*-1 is fixed in position on floor portion 300*a* proximate to first transverse edge 108, and fourth wall portion 200*s*-4 is fixed in position on floor portion 300*a*, opposite first wall portion 200*s*-1 and proximate to second transverse edge 110. First wall portion 200*s*-1 is joined to second wall portion 200*s*-2 with a hinge structure that permits wall portion 200*s*-2 to pivot about vertical axis 192 between a folded position and an unfolded position. Further, second wall portion 200*s*-2 is joined to third wall portion 200*s*-3 with a hinge structure to permit third wall portion 200*s*-3 to pivot about vertical axis 193 between a folded position and an unfolded position. For the opposing wall, fourth wall portion 200*s*-4 is joined to fifth wall portion 200*s*-5 with a hinge structure that permits first wall portion 200*s*-5 to pivot about vertical axis 194 between a folded position and an unfolded position. Notably, fifth wall portion 200*s*-5 is longer than either second wall portion 200*s*-2 or third wall portion 200*s*-3.

FIG. 2B depicts second wall portion 200*s*-2 and third wall portion 200*s*-3 both in their unfolded positions, where they are denominated by 200*s*-2*u* and 200*s*3-*u* respectively, and depicts fifth wall portion 200*s*-5 in its unfolded position, where it is denominated 200*s*-5*u*. FIG. 2B also depicts second wall portion 200*s*-2 and third wall portion 200*s*-3 both in their inwardly folded positions, where they are denominated by 200*s*-2*f* and 200*s*3-*f* respectively, and depicts fifth wall portion 200*s*-5 in its inwardly folded position, where it is denominated 200*s*-5*f*. When second wall portion 200*s*-2, third wall portion 200*s*-3 and fifth wall portion 200*s*-5 are in their inwardly folded positions, they facilitate forming a compact shipping module. When second wall portion 200*s*-2 and third wall portion 200*s*-3 are in their unfolded positions, with first wall portion 200*s*-1 they form the wall component 200*s* proximate first transverse edge 108. When fifth wall portion 200*s*-5 is in its unfolded position, with fourth wall portion 200*s*-4 they form the wall component 200*s* proximate second transverse edge 110.

The hinge structures described above (for securing each first wall portion 200*b*-1 to its second wall portion 200*b*-2, first wall portion 200*s*-1 to second wall portion 200*s*-2, second wall portion 200*s*-2 to third wall portion 200*s*-3, and fourth wall portion 200*s*-4 to fifth wall portion 200*s*-5), can be surface mounted or recessed, and of a temporary or permanent nature. The provision of interior edge reinforcement, as described above, can provide a region for securing hinge structures. Suitable hinge structures can be fabricated for example of metal, plastic, leather, ferrous or non-ferrous material. Alternatively, suitable hinge structures are disclosed in U.S. Nonprovisional patent application Ser. No. 16/786,202 entitled "Enclosure Component Perimeter Structures," having the same inventors and filed on the same date as the subject application. The contents of that U.S. Nonprovisional patent application Ser. No. 16/786,202 entitled "Enclosure Component Perimeter Structures," having the same inventors and filed on the same date as the subject application, are incorporated by reference as if fully set forth herein, particularly including the hinge structure described for example at paragraphs 147-157 and depicted in FIG. 15 thereof. These hinge structures can be utilized in addition to or in lieu of interior edge reinforcement, as described above, and can also perform a sealing function, to inhibit water ingress and environmental exposure.

Non-Partitioned Wall Components of Type 1 Structure (151). As compared to the two short wall components 200*b* of type 1 structure 151, which are each partitioned into two portions, the two long wall components 200a shown in FIG. 2A do not comprise plural wall portions, but rather each is a single piece structure. However, one of these long wall components 200a, which is located on floor portion 300b proximate to first longitudinal edge 106, and which is sometimes denominated as (long) wall component 200a-P in this disclosure, is pivotally secured to floor portion 300b to permit wall component 200a-P to pivot about horizontal axis 105 shown in FIG. 3A from a folded position to an unfolded position. Pivotally securing long wall component 200a-P also facilitates forming a compact shipping module 100. The remaining long wall component 200a, sometimes denominated 200a-R in this disclosure, is rigidly secured on floor portion 300a proximate second longitudinal edge 116 and abutting the vertical edges of the two first wall portions 200b-1 proximate second longitudinal edge 116, as shown in FIG. 2A.

Non-Partitioned Wall Components of Type 2 Structure (152). As compared to the two wall components 200s of type 2 structure 152, which are each partitioned into portions, the remaining two wall components 200s shown in FIG. 2B do not comprise plural wall portions, but rather are single piece structures. However, one of these wall components 200s, which is sometimes denominated 200s-P in this disclosure, and which is located on floor portion 300b proximate to first longitudinal edge 106, is pivotally secured to floor portion 300b to permit wall component 200s-P to pivot about horizontal axis 105 shown in FIG. 3B from a folded position to an unfolded position. Pivotally securing wall component 200s-P also facilitates forming a compact shipping module 100. The remaining wall component 200s, sometimes denominated 200s-R in this disclosure, is rigidly secured on floor portion 300a proximate second longitudinal edge 116 and abutting the vertical edges of first wall portion 200s-1 and fourth wall portion 200s-4 proximate to second longitudinal edge 116, as shown in FIG. 2B.

The hinge structures described above, for securing wall component 200a-P to floor portion 300b, and for securing wall component 200s-P to floor portion 300b, can be surface mounted or recessed, and of a temporary or permanent nature. The provision of exterior edge reinforcement, as described above, can provide a region for securing hinge structures. Suitable hinge structures can be fabricated for example of metal, plastic, leather, ferrous or non-ferrous material. Alternatively, suitable hinge structures are disclosed in U.S. Nonprovisional patent application Ser. No. 16/786,202 entitled "Enclosure Component Perimeter Structures," having the same inventors and filed on the same date as the subject application (with the utilized hinge structure altered as may be appropriate, given the 90 degree (90°) junction between floor component 300b and wall component 200a-P/200s-P when either of the latter is in an unfolded position). The contents of that U.S. Nonprovisional patent application Ser. No. 16/786,202 entitled "Enclosure Component Perimeter Structures," having the same inventors and filed on the same date as the subject application, are incorporated by reference as if fully set forth herein, particularly including the hinge structures described for example at paragraphs 125-157 and depicted in FIGS. 13A-15 thereof. These hinge structures can be utilized in addition to or in lieu of exterior edge reinforcement, as described above, and can also perform a sealing function, to inhibit water ingress and environmental exposure.

Wall Chases. Where wall component 200 utilizes one of the multi-laminate designs described with respect to FIGS. 4A-4C, the foam panels 214 can be provided with a series of elongate, generally parallel, approximately vertically-oriented cylindrical passageways, spaced apart at regular intervals across the entire distance between end pieces 270, with each spanning the distance between floor plate 220 and ceiling plate 240. These vertical passageways are denominated wall chases 219 and can be seen in FIG. 6A in wall components 200a, 200b for a type 1 structure 151, and in FIG. 7A for a wall component 200s for a type 2 structure 152. Wall chases 219 facilitate the installation of utility lines (such as for electrical power, lighting control, heating, ventilation, and air conditioning (HVAC), HVAC control, security systems, including energizing and communicating with smoke or heat sensors, etc.), in wall component 200. Further details concerning these wall chases are described in U.S. Nonprovisional patent application Ser. No. 16/786,130 entitled "Foldable Building Structures with Utility Channels and Laminate Enclosures," having the same inventors and filed on the same date as the subject application. The contents of that U.S. Nonprovisional patent application Ser. No. 16/786,130 entitled "Foldable Building Structures with Utility Channels and Laminate Enclosures," having the same inventors and filed on the same date as the subject application, are incorporated by reference as if fully set forth herein, particularly the details relating to wall chases, and especially those found at paragraphs 0077-0081 and in FIGS. 5A-5C, 6A and 7A. In the event that communication is desired between wall chases 219 and the regions above ceiling plate 240 and/or below floor plate 220, and the wall component 200 is provided with enclosure component perimeter structures, of a type described in U.S. Nonprovisional patent application Ser. No. 16/786,202 entitled "Enclosure Component Perimeter Structures," having the same inventors and filed on the same date as the subject application, either bonded over or in place of either or both of floor plate 220 and ceiling plate 240, then those enclosure component perimeter structures can be provided with suitable apertures at appropriate locations to permit communication to the wall chases 219.

Wall Customization Options. FIGS. 1A and 2A depicts wall components 200 having plural apertures, specifically door apertures 202, for receiving door frame and door assemblies, and window apertures 204, for receiving window frame and window assemblies. The multi-laminate construction of wall component 200 lends itself to a high degree of customization in terms of type, size and location of doors, windows and the like, while the number of apertures 202, 204 can be varied in accordance with design preference. Further details concerning customization of wall component 200 are described in U.S. Nonprovisional patent application Ser. No. 16/786,130 entitled "Foldable Building Structures with Utility Channels and Laminate Enclosures," having the same inventors and filed on the same date as the subject application. The contents of that U.S. Nonprovisional patent application Ser. No. 16/786,130 entitled "Foldable Building Structures with Utility Channels and Laminate Enclosures," having the same inventors and filed on the same date as the subject application, are incorporated by reference as if fully set forth herein, particularly the details relating to wall customization, found for example at paragraphs 0082-0084 and in FIGS. 1A and 2A thereof.

Ceiling Component (400)

Figure 6A:
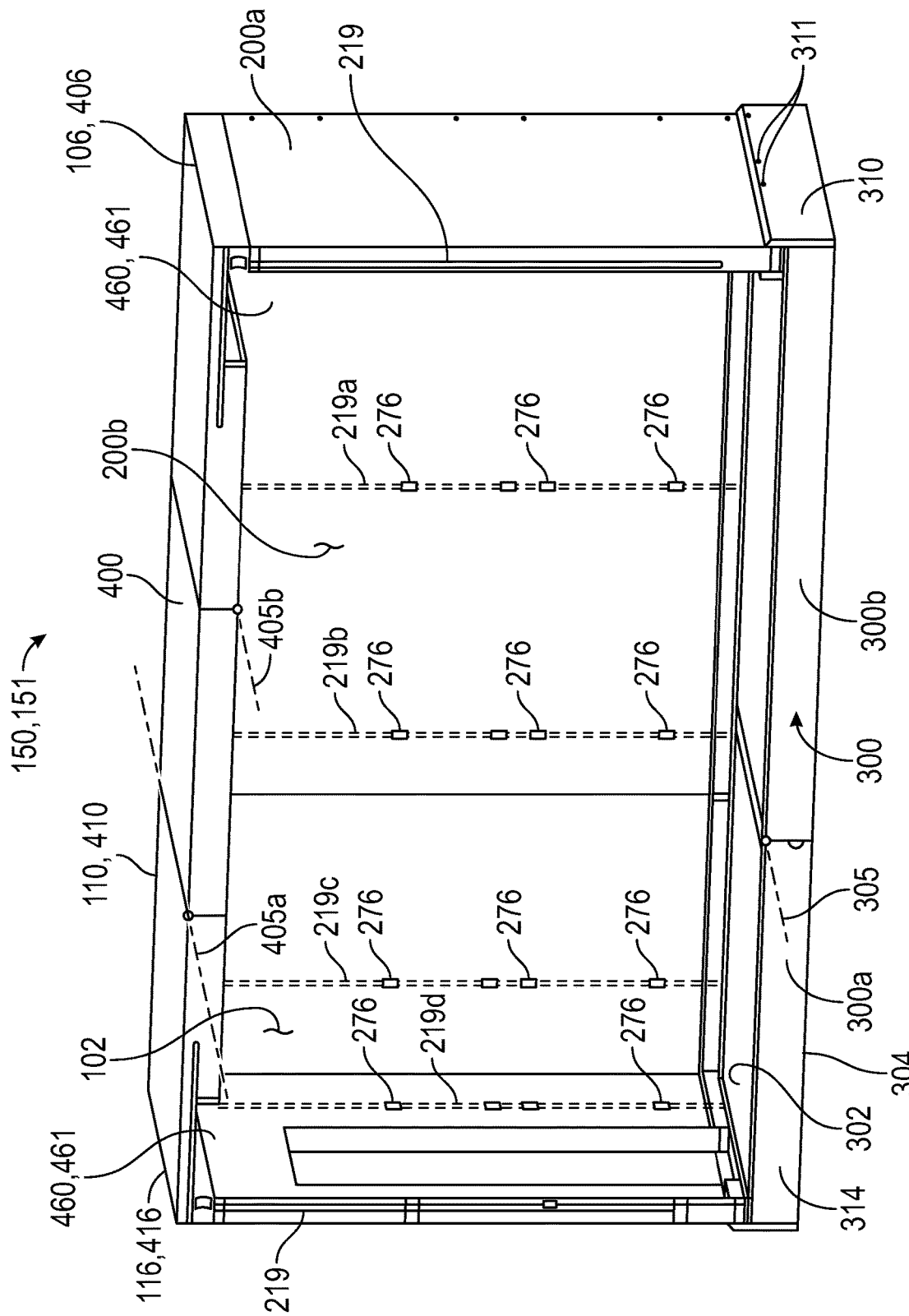
FIGS. 6A and 6B are partial cutaway perspective views of a finished structure in accordance with the present inventions, depicting in greater detail aspects of the ceiling, wall and floor components of a first type of structure in accordance with the present inventions.
Figure 6B:
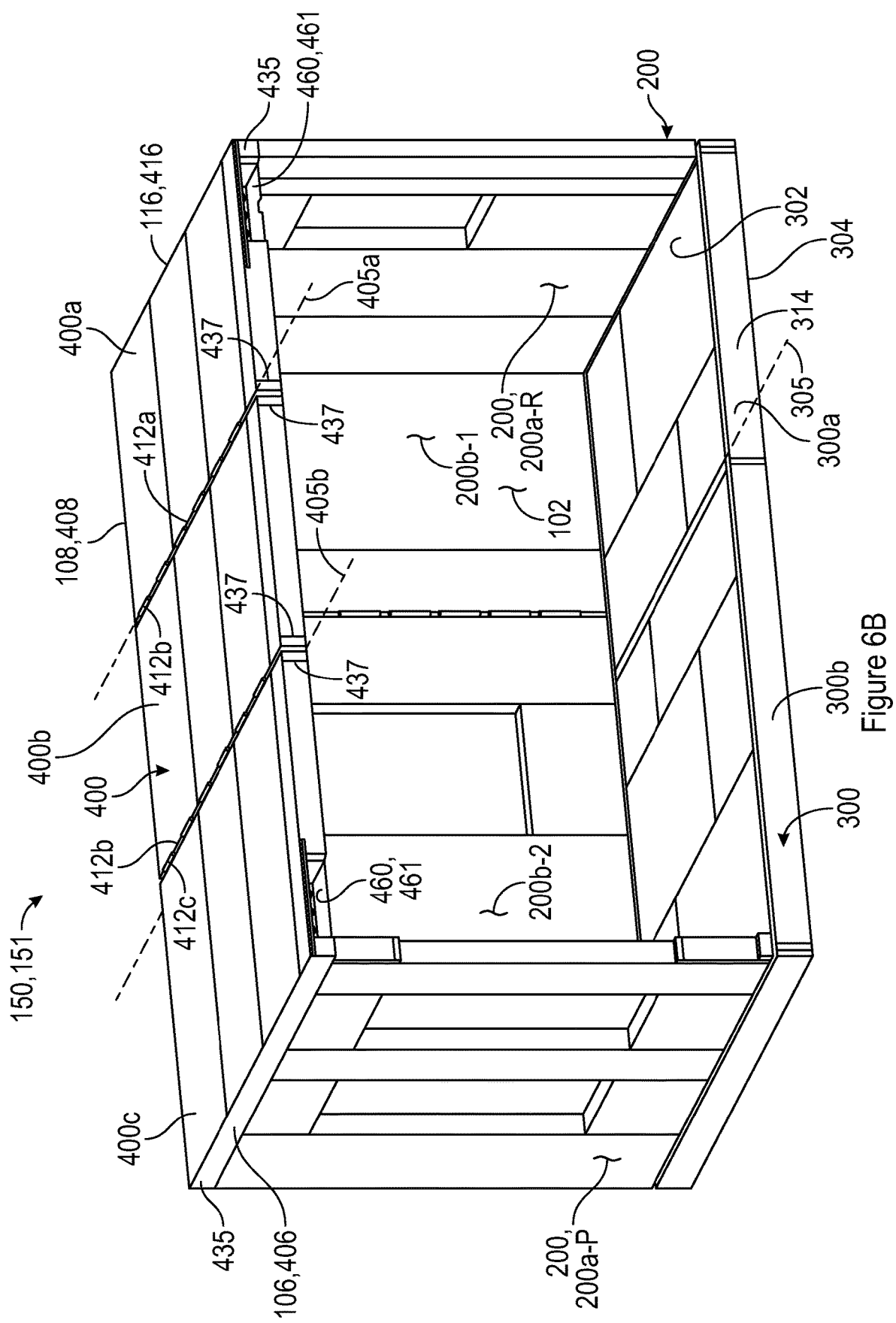
Figure 7A:
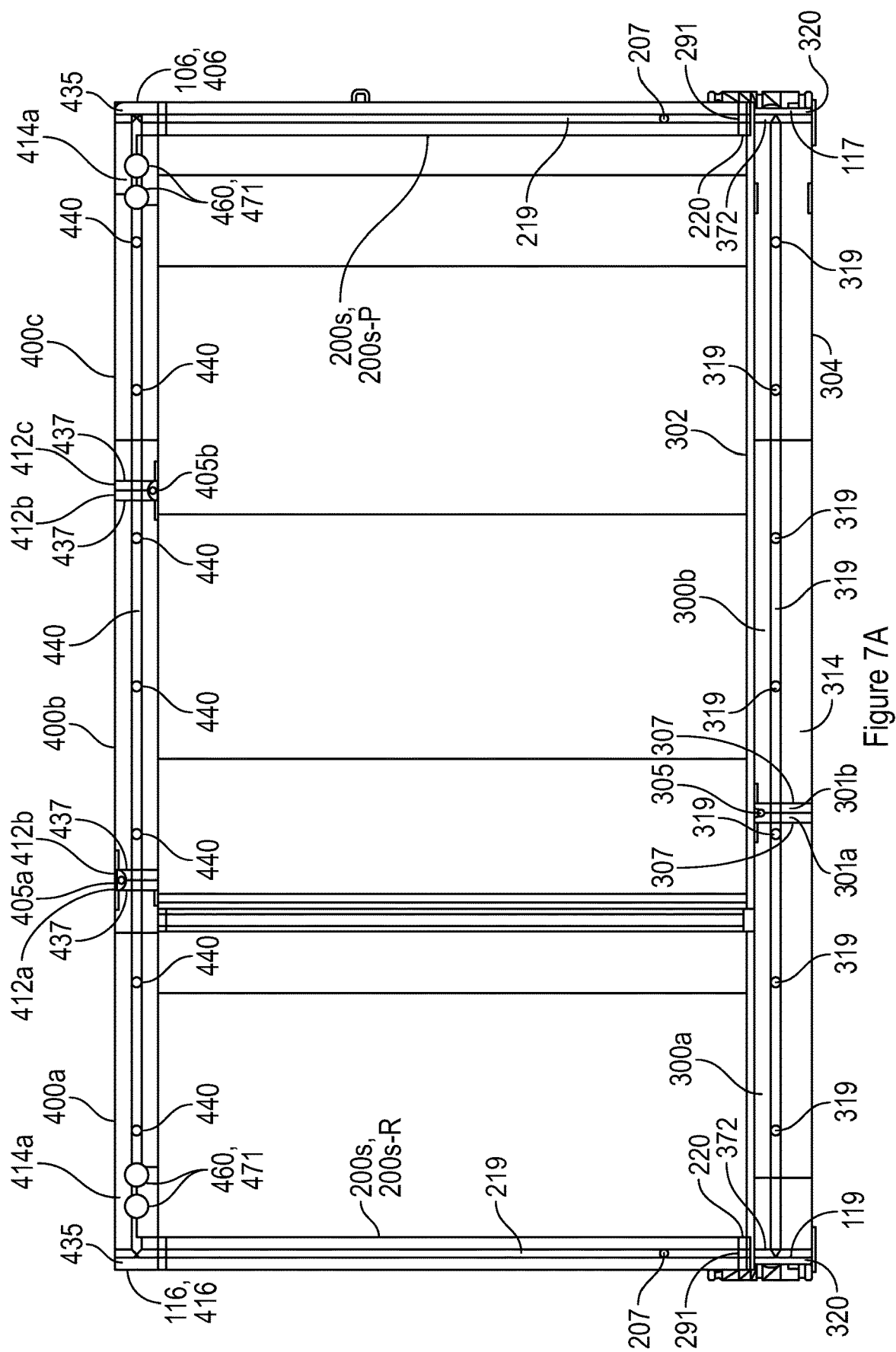
FIGS. 7A and 7B are partial cutaway views of a finished structure in accordance with the present inventions, depicting in greater detail aspects of the ceiling, wall and floor components of a second type of structure in accordance with the present inventions.
Figure 7B:
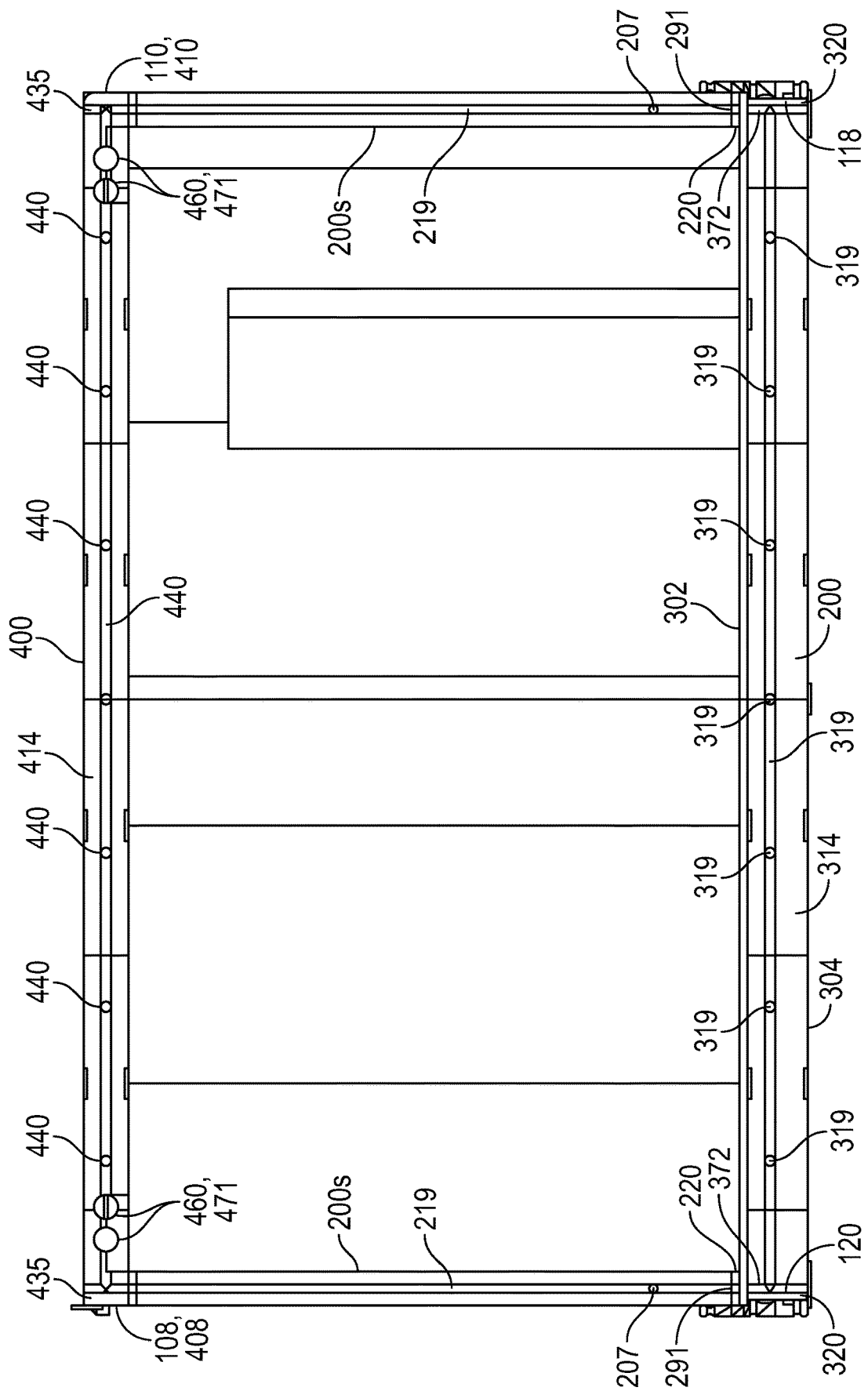

Typically, a finished structure 150 will utilize one ceiling component 400; thus ceiling component 400 generally is the full ceiling of finished structure 150. Ceiling component 400 has a generally rectangular perimeter. Among others, FIGS. 6A-7B depict ceiling component 400 in accordance with the present inventions. The perimeter of ceiling component 400 is defined by first longitudinal ceiling edge 406, first transverse ceiling edge 408, second longitudinal ceiling edge 416 and second transverse ceiling edge 410. In particular, (a) first longitudinal ceiling edge 406, (b) first transverse ceiling edge 408, (c) second longitudinal ceiling edge 416 and (d) second transverse ceiling edge 410 of ceiling component 400 generally coincide with (i.e., overlie) (w) first longitudinal edge 106, (x) first transverse edge 108, (y) second longitudinal edge 116 and (z) second transverse edge 110, respectively, of finished structure 150. FIGS. 6A and 6B depict the ceiling component 400 of a type 1 structure 151, and FIGS. 7A and 7B depict the ceiling component 400 of a type 2 structure 152. The basic structure and design of ceiling component 400 is the same for both type 1 structure 151 and type 2 structure 152, and are applicable to structures 150 generally, and is generally applicable to ceiling components 400 of structures 150 fabricated in accordance with this disclosure.

The length and width of ceiling component 400 can vary in accordance with design preference. In a particular embodiment of the type 1 structure 151 depicted in FIGS. 1A and 2A, ceiling component 400 (the dimension along first and second longitudinal edges 106, 116) is approximately thirty-nine feet (11.89 m) in length (the dimension along first and second longitudinal ceiling edges 406, 416) and approximately 19.5 feet (5.94 m) in width (the dimension along first and second transverse ceiling edges 408, 410). In a particular embodiment of the type 2 structure 152 depicted in FIGS. 1B and 2B, ceiling component 400 is approximately 19 feet (5.79 m) square.

It is preferred that ceiling component 400 utilize one of the multi-laminate designs described above in regard to FIGS. 4A-4D, as described below.

The perimeter of ceiling component 400 is generally provided with exterior edge reinforcement. As exterior edge reinforcement for the embodiments of ceiling component 400 shown for a type 1 structure 151 in FIG. 6B and for a type 2 structure 152 in FIG. 7A, a first shoulder beam 435 is positioned at the first longitudinal ceiling edge 406 of ceiling component 400, a second shoulder beam 435 (visible edge-on in FIG. 7B) is positioned at the second transverse ceiling edge 408 of ceiling component 400, a third shoulder beam 435 (visible edge-on in FIG. 7B) is positioned at the first transverse exterior ceiling edge 410 of ceiling component 400, and a fourth shoulder beam 435 is positioned at the second longitudinal ceiling edge 416 of ceiling component 400 (see FIG. 6B). In the case of ceiling component 400, in addition to protecting the exterior edges of foam panel material, the exterior edge reinforcement provided by shoulder beams 435 assists in resisting vertical loads and transferring such loads to lower floors through underlying wall components 200 supporting ceiling component 400, and then to the foundation of the finished structure 150. Such exterior edge reinforcement can also provide a region for fastening like regions of abutting enclosure components 155 (underlying and any overlying).

The exterior edge reinforcement provided by shoulder beams 435 of ceiling component 400 can be fabricated from one or more of laminated strand lumber board, wooden board, C-channel extruded aluminum or steel, or the like. Alternatively, appropriate enclosure component perimeter structures of a type disclosed in U.S. Nonprovisional patent application Ser. No. 16/786,202 entitled "Enclosure Component Perimeter Structures," having the same inventors and filed on the same date as the subject application, can be employed in addition to or in substitution for exterior edge reinforcement of the type just described for ceiling component 400. The contents of that U.S. Nonprovisional patent application Ser. No. 16/786,202 entitled "Enclosure Component Perimeter Structures," having the same inventors and filed on the same date as the subject application, are incorporated by reference as if fully set forth herein, particularly including the enclosure component perimeter structures described for example at paragraphs 110-124 and in FIGS. 10-12 thereof. Notably, those enclosure component perimeter structures can also perform a sealing function, to inhibit water ingress and environmental exposure.

Ceiling Partitioning

The type 1 structure 151 and the type 2 structure 152 each includes ceiling portions 400a, 400b and 400c. Each of the ceiling portions 400a, 400b and 400c is a planar generally rectangular structure, with ceiling portion 400a adjoining ceiling portion 400b, and ceiling portion 400b adjoining ceiling portion 400c as exemplified by FIGS. 6A and 6B.

Ceiling Portion 400c. Ceiling portion 400c is generally exemplary of the construction of all ceiling portions 400a, 400b and 400c. Referring to the segment of ceiling portion 400c depicted in FIG. 6C, ceiling portion 400c utilizes a laminated multi-layer design according to the first embodiment thereof (depicted in FIG. 4A) or the second embodiment thereof (depicted in FIG. 4B). As relevant here, ceiling portion 400c includes a first structural layer 210 of structural building panels 211, denominated ceiling bottom surface 404, and a second structural layer 215 of structural building panels 216, denominated ceiling top surface 402. Between ceiling surfaces 402 and 404 there are foam panels 214, denominated ceiling foam panels 414. Interior edge 412c of ceiling component 400c abuts a first interior edge 412b of ceiling component 400b, as shown in FIGS. 6B and 7A. For interior edge reinforcement, a reinforcing board 437 is positioned adjacent interior edge 412c.

Ceiling Portion 400a. Ceiling portion 400a is shown for example in FIGS. 6B and 7A. It is a mirror image in design and construction of ceiling portion 400c. Interior edge 412a of ceiling portion 400a abuts a second interior edge 412b of ceiling portion 400b, as shown in FIGS. 6B and 7A. For interior edge reinforcement, a reinforcing board 437 is positioned adjacent interior edge 412a.

Ceiling Portion 400b. Ceiling portion 400b shown in FIGS. 6B and 7A is the same in general design and construction as ceiling portions 400a and 400c. First interior edge 412b of ceiling component 400b abuts interior edge 412c of ceiling component 400c, and second interior edge 412b of ceiling component 400b abuts interior edge 412a of ceiling portion 400a. For interior edge reinforcement, a reinforcing board 437 is positioned adjacent first interior edge 412b of ceiling portion 400b, and a reinforcing board 437 is positioned adjacent second interior edge 412b of ceiling portion 400b.

Ceiling component 400 and its constituent elements are generally dimensioned in thickness and otherwise to accommodate the particular loads to which ceiling component 400 may be subject. A particular embodiment of ceiling component 400 in the type 2 structure 152 shown for example in FIGS. 7A and 7B can utilize the second multi-layer design embodiment (see FIG. 4B) with 0.25 inch (0.635 cm) thick MgO board for structural building panels 211 of first structural layer 210/ceiling bottom surface 404 and also for structural building panels 216 of second structural layer 211/ceiling top surface 402, and with binding strips of 0.25 inch (0.635 cm) thick MgO board six inches (15.24 cm) wide. The foam panels 214/ceiling foam panels 414 can be 7.9 inches (20.07 cm) thick, yielding a roof component 400 approximately 8.4 inches (21.34 cm) thick. Additional structural members, such as joists, can be utilized as is appropriate to the specific design of structure 150 to assist in the transfer of vertical loads to one or more shoulder beams 435.

Referring to the type 1 structure 151 shown in FIG. 6B, ceiling portion 400a is fixed in position relative to first portions 200b-1 of short wall components 200b and relative to long wall component 200a-R, and is joined with hinge structures along longitudinal interior edge 412a to the abutting longitudinal interior edge 412b of ceiling portion 400b. Such hinge structures are adapted to permit ceiling portion 400b to pivot through up to one hundred and eighty degrees (180°) of arc about a horizontal axis 405a, located proximate the top of ceiling component 400, between a folded position, where ceiling portion 400b lies flat against ceiling portion 400a, and the fully unfolded position shown in FIG. 6B.

In turn, ceiling portion 400b is joined with hinge structures to ceiling portion 400c at the longitudinal interior edge 412b of ceiling portion 400b abutting the longitudinal interior edge 412c of ceiling portion 400c. Such hinge structures are adapted to permit ceiling portion 400c to pivot through up to one hundred and eighty degrees (180°) of arc about a horizontal axis 405b, located proximate the bottom of ceiling component 400, between a folded position, where ceiling portion 400c lies flat against ceiling portion 400b (when ceiling portion 400b is positioned to lie flat against ceiling portion 400a), and the fully unfolded position shown in FIG. 6B.

Likewise referring to the type 2 structure 152 shown in FIG. 7A, ceiling portion 400a is fixed in position relative to first wall portion 200s-1, fourth wall portion 200s-4 and wall component 200s-R. Ceiling portions 400a, 400b and 400c for type 2 structure 152 are joined with hinge structures in the same manner as described above in connection with type 1 structure 151.

The hinge structures joining ceiling portions 400a, 400b and 400c can be surface mounted or recessed, and of a temporary or permanent nature. Suitable hinge structures can be fabricated for example of metal, plastic, leather, ferrous or non-ferrous material. The interior edge reinforcement provided by reinforcing boards 437 of ceiling portions 400a, 400b and 400c provides structure for mounting hinge structures, in addition to protecting the edges of foam panel material. Reinforcing boards 437 can be fabricated for example from one or more of laminated strand lumber board, wooden board, C-channel extruded aluminum or steel, or the like.

Figure 9:
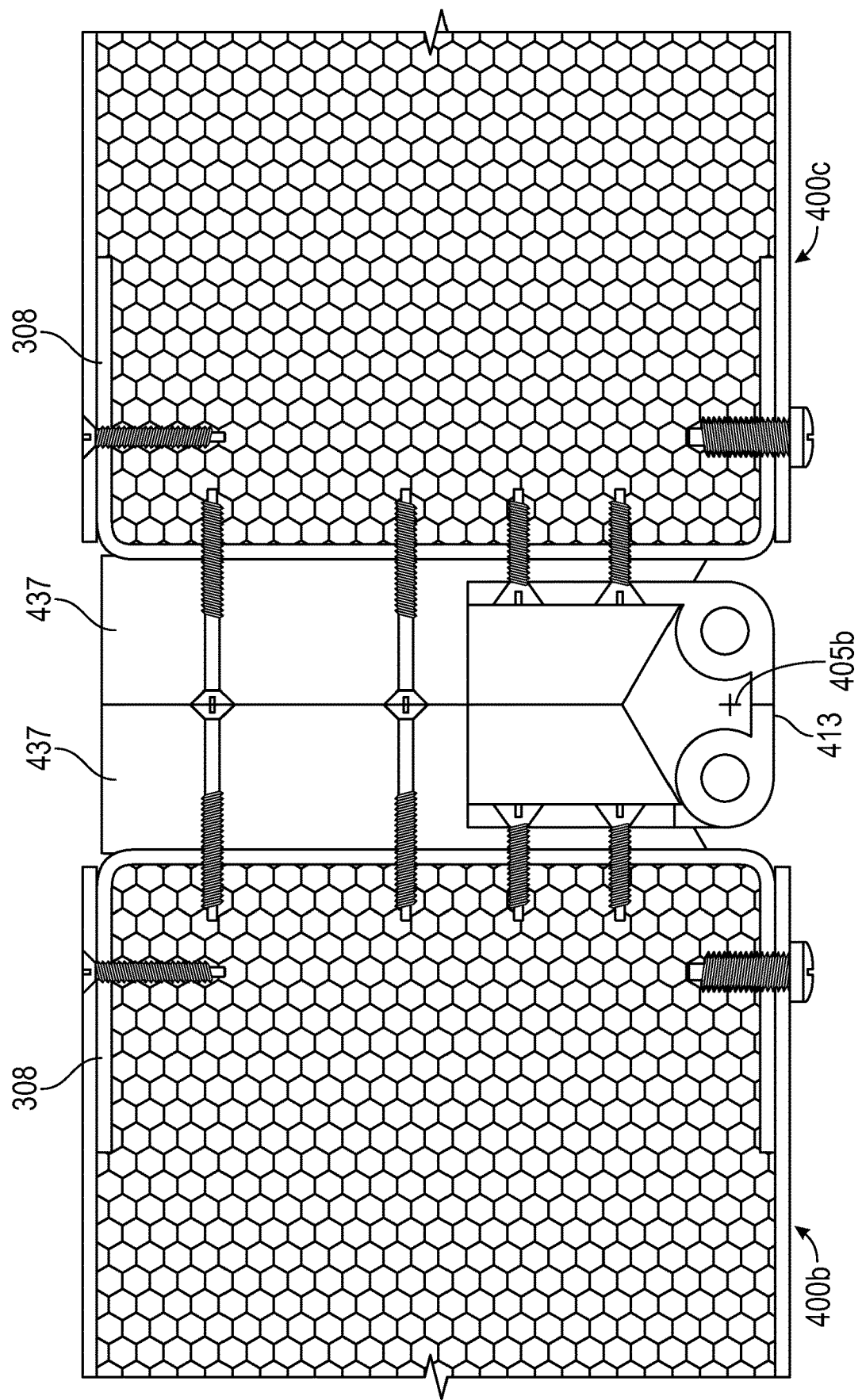
FIG. 9 is a schematic side view of an embodiment of a hinge structure joining two roof portions in accordance with the present inventions.

A suitable hinge structure and its associated members is shown in FIG. 9, which depicts an exemplary hinge structure joining ceiling portions 400b and 400c. In particular, a plurality of double hinges 413 are arranged in line along horizontal axis 405b. Double hinges are preferred to permit the hinges to be recessed below the surface, while retaining the ability to pivot through up to one hundred eighty degrees (180°) of arc, without causing interference crimping between adjacent ceiling portions. These double hinges can be fabricated by positioning together in an abutting relationship two single hinges, each along one of their respective leaves, and welding them to fashion one double hinge 413.

As shown in FIG. 9, each of the free leaves of double hinge 413 are respectively secured to a reinforcing board 437. Each reinforcing board 437 is positioned against the exterior of the web of a C-channel track 308 (fabricated from cold formed steel), each of which in turn is secured to the respective abutting edges of roof portions 400b and 400c, as shown in FIG. 9. The same hinge structure can be utilized to secure together ceiling portions 400a and 400b, although rotated 180 degrees and displaced to be arranged in line along horizontal axis 405a, so as to permit the ceiling portions 400b and 400c to fold in an accordion pattern, as shown in FIGS. 3A and 3B.

As further alternatives to the hinge structure depicted in FIG. 9, suitable hinge structures are disclosed in U.S. Nonprovisional patent application Ser. No. 16/786,202 entitled "Enclosure Component Perimeter Structures," having the same inventors and filed on the same date as the subject application. The contents of that U.S. Nonprovisional patent application Ser. No. 16/786,202 entitled "Enclosure Component Perimeter Structures," having the same inventors and filed on the same date as the subject application, are incorporated by reference as if fully set forth herein, particularly including the hinge structures described for example at paragraphs 125-157 and depicted in FIGS. 13A-15 thereof, and more particularly the hinged structure described at paragraphs 136-146 and depicted in FIGS. 14A-14F. These hinge structures can be employed in addition to or in substitution for the interior edge reinforcement provided by reinforcing boards 437 of ceiling portions 400a, 400b and 400c, and can also perform a sealing function, to inhibit water ingress and environmental exposure.

Utility Service System and Ceiling Chases. Ceiling component 400 can be provided with a utility service system 460, which is one or more recessed passageways of closed loop form, located about the entirety of the periphery of ceiling component 400 proximate to the shoulder beams 435 included in those ceiling portions 400a, 400b and 400c, to facilitate routing of utility lines (such as for electrical power, lighting control, HVAC, HVAC control, security systems, including energizing and communicating with smoke or heat sensors, etc.). FIGS. 6A and 6B show one embodiment of utility service system 460 (denominated 461 in those figures), and FIGS. 7A and 7B show another embodiment of utility service system 460 (denominated 462 in those figures). For the same purpose, ceiling component 400 can also be provided with ceiling chases 440, which are a plurality of elongate spaced-apart cylindrical passages in ceiling portions 400a, 400b and 400c. The utility service system 460 is adapted to communicate with both the ceiling chases 440 and wall chases 219. Further details concerning utility service system 460 and ceiling chases 440 for ceiling component 400 are described in U.S. Nonprovisional patent application Ser. No. 16/786,130 entitled "Foldable Building Structures with Utility Channels and Laminate Enclosures," having the same inventors and filed on the same date as the subject application. The contents of that U.S. Nonprovisional patent application Ser. No. 16/786,130 entitled "Foldable Building Structures with Utility Channels and Laminate Enclosures," having the same inventors and filed on the same date as the subject application, are incorporated by reference as if fully set forth herein, particularly the details relating to utility service system 460 and wall chases 440, found for example at paragraphs 0102-0120 and in FIGS. 6A-7E thereof.

Floor Component (300)

Typically, a finished structure 150 will utilize one floor component 300; thus floor component 300 generally is the full floor of finished structure 150. Floor component 300 has a generally rectangular perimeter. FIGS. 6A-6B and 7A-7B depict floor component 300 in accordance with the present inventions. The perimeter of floor component 300 is defined by first longitudinal floor edge 117, first transverse floor edge 120, second longitudinal floor edge 119 and second transverse floor edge 118. In particular, (a) first longitudinal floor edge 117, (b) first transverse floor edge 120, (c) second longitudinal floor edge 119 and (d) second transverse floor edge 118 generally coincide with (i.e., underlie) (w) first longitudinal edge 106, (x) first transverse edge 108, (y) second longitudinal edge 116 and (z) second transverse edge 110, respectively, of finished structure 150. FIGS. 6A and 6B depict the floor component 300 for a type 1 structure 151, and FIGS. 7A and 7B depict the floor component 300 for a type 2 structure 152. The basic structure of floor component 300 is the same for both type 1 structure 151 and type 2 structure 152, and is generally applicable to floor components 300 of structures 150 fabricated in accordance with this disclosure.

The length and width of floor component 300 can vary in accordance with design preference. In the particular embodiment of the type 1 structure 151 depicted in FIGS. 1A and 2A, where wall components 200a, 200b are vertically oriented, the length and width of ceiling component 400 approximates the length and width of ceiling component 400 for that type 1 structure. Likewise in the particular embodiment of the type 2 structure 152 depicted in FIGS. 1B and 2B, where wall components 200s are vertically oriented, the length and width of ceiling component 400 approximates the length and width of ceiling component 400 for that type 2 structure.

It is preferred that floor component 300 utilize one of the multi-laminate designs described above in regard to FIGS. 4A-4D, as described below.

The perimeter of each floor component 300 is generally provided with exterior edge reinforcement. As exterior edge reinforcement for the embodiments of floor component 300 shown in FIGS. 7A and 7B, a first footing beam 320 (visible edge-on in FIG. 7A) is positioned at the first longitudinal floor edge 117 of floor component 300, a second footing beam 320 (visible edge-on in FIG. 7B) is positioned at the second transverse floor edge 118 of floor component 300, a third footing beam 320 (visible edge-on in FIG. 7B) is positioned at the first transverse floor edge 120 of floor component 300, and a fourth footing beam 320 is positioned at the second longitudinal floor edge 119 of floor component 300 (visible edge-on in FIG. 7A). In the case floor component 300, the edge reinforcement provided by footing beams 320 assists in resisting vertical loads and transferring such loads to any ceiling component 400 thereunder and then to underlying wall components 200, and/or to the foundation of the finished structure 150, in addition to protecting the edges of foam panel material.

The exterior edge reinforcement provided by footing beams 420 of floor component 300 can be fabricated from one or more of laminated strand lumber board, wooden board, C-channel extruded aluminum or steel or the like. Alternatively, appropriate enclosure component perimeter structures of a type disclosed in U.S. Nonprovisional patent application Ser. No. 16/786,202 entitled "Enclosure Component Perimeter Structures," having the same inventors and filed on the same date as the subject application, can be employed in addition to or in substitution for exterior edge reinforcement of the type just described for floor component 300. The contents of that U.S. Nonprovisional patent application Ser. No. 16/786,202 entitled "Enclosure Component Perimeter Structures," having the same inventors and filed on the same date as the subject application, are incorporated by reference as if fully set forth herein, particularly including the enclosure component perimeter structures described for example at paragraphs 110-124 and in FIGS. 10-12 thereof. Notably, those enclosure component perimeter structures can also perform a sealing function, to inhibit water ingress and environmental exposure.

Floor Partitioning

The floor component 300 in type 1 structure 151 and in type 2 structure 152 comprises floor portion 300a and floor portion 300b. Each of the floor portions 300a and 300b is a planar generally rectangular structure, with floor portion 300a adjoining floor portion 300b, as exemplified by FIGS. 6A, 6B and 7A.

Floor Portion 300a. Floor portion 300a, shown in FIGS. 6A, 6B and 7A, is generally exemplary of the construction of floor portions 300a and 300b, and as depicted generally utilizes a laminate multi-layer design in accordance with the first or second embodiment thereof respectively illustrated in FIGS. 4A and 4B. As relevant here, floor portion 300a includes a first structural layer 210 of structural building panels 211, denominated floor bottom surface 304 and a second structural layer 215 of structural building panels 216, denominated floor top surface 302. Between floor surfaces 302 and 304 there are foam panels 214, denominated floor foam panels 314. Interior edge 301a of floor portion 300a abuts interior edge 301b of floor portion 300b, as shown in FIG. 7A. As interior edge reinforcement, a reinforcing board 307 is positioned adjacent interior edge 301a.

Floor Portion 300b. Floor portion 300b is shown for example in FIGS. 6A, 6B and 7A. It is the same in general design and construction as floor portion 300a. Interior edge 301b of floor portion 300b abuts interior edge 301a of floor portion 300a, as shown in FIG. 7A. As interior edge reinforcement, a reinforcing board 307 is positioned adjacent interior edge 301b.

Floor component 300 and its constituent elements are generally dimensioned in thickness and otherwise to accommodate the particular loads to which floor component 300 may be subject. A particular embodiment of floor component 300 for the type 2 structure 152 shown for example in FIGS. 7A and 7B can utilize the second multi-layer design embodiment (see FIG. 4B) with 0.25 inch (0.635 cm) thick MgO board for structural building panels 211 of first structural layer 210/floor bottom surface 304, and 0.5 inch (1.27 cm) thick MgO board for structural building panels 216 of second structural layer 211/floor top surface 302. Correspondingly in this particular embodiment, binding strips of 0.25 inch (0.635 cm) thick MgO board six inches (15.24 cm) wide are used to join together the structural building panels 211 of first structural layer 210/floor bottom surface 304, and binding strips of 0.5 inch (1.27 cm) thick MgO board six inches (15.24 cm) wide are used to join together the structural building panels 216 of second structural layer 211/floor top surface 302. The foam panels 214/floor foam panels 314 can be 11.25 inches (28.575 cm) thick, yielding a floor component 300 approximately 12 inches (30.48 cm) thick.

The floor portion 300b comprising floor component 300 can be folded to facilitate forming a compact shipping module. The type 1 structure 151 and the type 2 structure 152 each includes such a floor portion.

Referring to the type 1 structure 151 shown in FIG. 6B, floor portion 300a is fixed in position relative to first wall portions 200b-1 of short wall components 200b and relative to long wall component 200a-R, and is joined with hinge structures to floor portion 300b, so as to permit floor portion 300b to pivot through approximately ninety degrees (90°) of arc about a horizontal axis 305, located proximate floor top surface 302, between a folded position, where floor portion 300b is approximately vertically oriented as shown in FIG. 3A, and the fully unfolded position shown in FIGS. 6A and 6B.

Likewise referring to the type 2 structure 152 shown in FIG. 7A, floor portion 300a is fixed in position relative to first wall portion 200s-1, fourth wall portion 200s-4 and wall component 200s-R. Floor portion 300a is joined with hinge structures to floor portion 300b in the same manner as described above in connection with type 1 structure 151.

Figure 8:
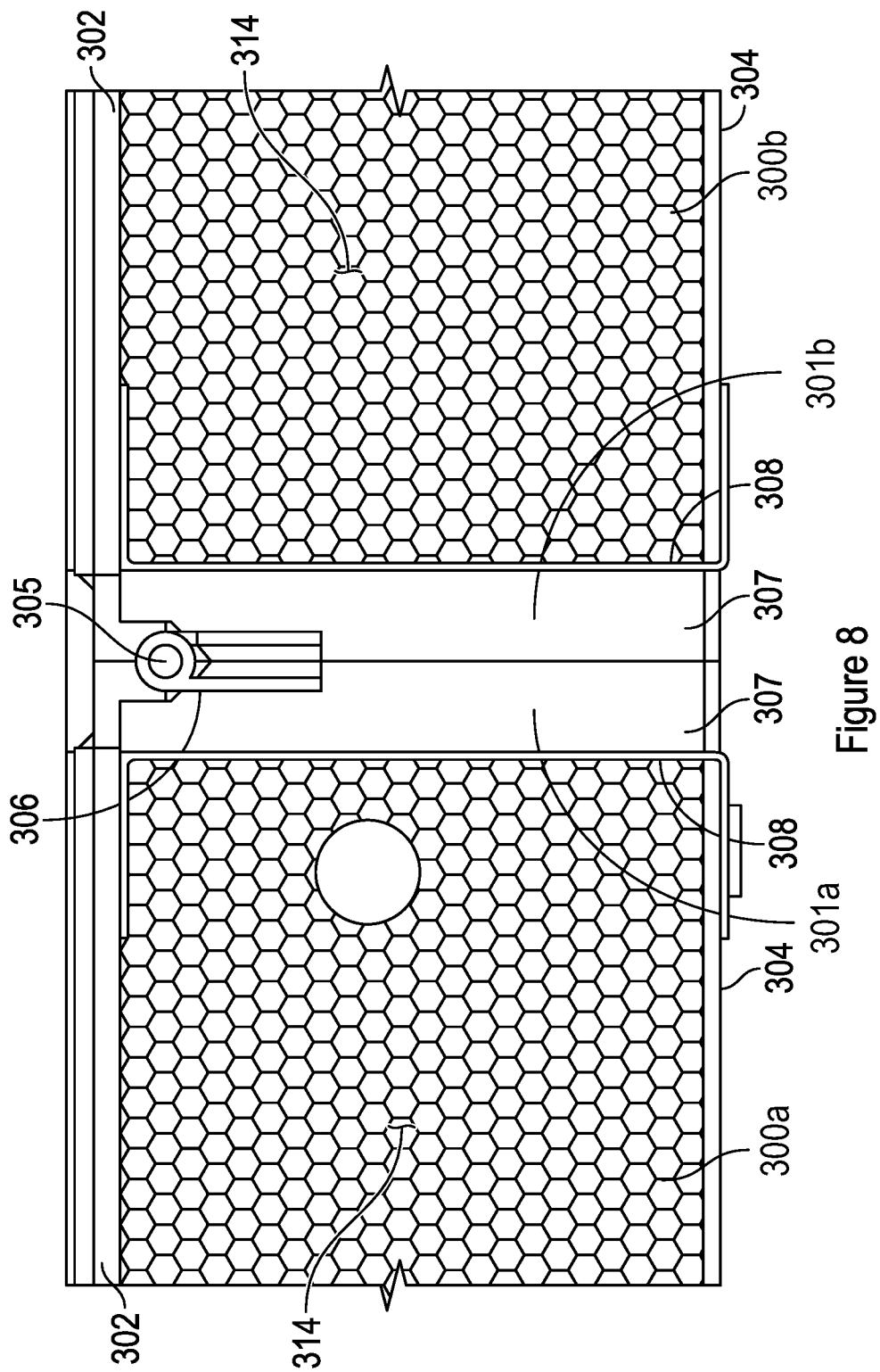
FIG. 8 is a schematic side view of an embodiment of a hinge structure joining two floor portions in accordance with the present inventions.

The hinge structures joining floor portions 300a and 300b can be surface mounted or recessed, and of a temporary or permanent nature. Suitable hinge structures can be fabricated for example of metal, plastic, leather, ferrous or non-ferrous material. An example of a suitable hinge structure and its associated members is shown in FIG. 8. In particular, a plurality of steel hinges 306, for example approximately three inches (7.62 cm) wide by approximately six inches (15.24 cm) long, are arranged in line along horizontal axis 305, as shown edge-on in FIG. 8. Such hinges are commercially available from McMaster-Carr, Douglasville, Ga. USA. The hinge structures joining floor portions 300a and 300b need not be double hinges, since they need to pivot only through approximately ninety degrees (90°) of arc, and thus the potential for interference crimping is less than in connection with the ceiling portions of ceiling component 400.

As shown in FIG. 8, the opposing leaves of hinges 306 are respectively secured to the interior edge reinforcement, reinforcing board 307, provided at each of interior edges 301a and 301b. Reinforcing boards 307 in FIG. 8 are made of laminated strand lumber. Each reinforcing board 307 is positioned against the exterior of the web of a C-channel track 308 (fabricated from cold formed steel), each of which in turn is secured to the respective abutting edges of floor portions 200a and 200b, as shown in FIG. 8.

Alternatively, suitable hinge structures for joining floor portions 300a and 300b are disclosed in U.S. Nonprovisional patent application Ser. No. 16/786,202 entitled "Enclosure Component Perimeter Structures," having the same inventors and filed on the same date as the subject application. The contents of that U.S. Nonprovisional patent application Ser. No. 16/786,202 entitled "Enclosure Component Perimeter Structures," having the same inventors and filed on the same date as the subject application, are incorporated by reference as if fully set forth herein, particularly including the hinge structures described for example at paragraphs 125-157 and depicted in FIGS. 13A-15 thereof, and more particularly the hinged structure described at paragraphs 125-135 and depicted in FIGS. 13A-F. These hinge structures can be utilized in addition to or in place of interior edge reinforcement, as described above, and can also perform a sealing function to inhibit water ingress and environmental exposure.

Baseboard and Perimeter Board. The exterior edges of floor component 300, or portions thereof, such as the exterior edge of floor portion 300b located along first longitudinal edge 106 of finished structure 150, can be provided with a baseboard 310. In the type 1 structure 151 shown for example in FIG. 3A, a baseboard 310 is shown edge-on secured to the exterior edge of floor portion 300b. Where baseboard 310 extends around the perimeter of floor component 300, it is termed perimeter board 312. The type 2 structure 152 shown for example in FIGS. 1B and 3B utilizes a perimeter board 312. It is preferred that the vertical dimension (height) of baseboard 310 (including perimeter board 312) be greater than the thickness of floor component 300.

Floor Chases. Optionally, the floor foam panels 314 in floor component 300 can be provided with floor chases 319, which are a plurality of elongate spaced-apart cylindrical passages in floor portions 300a and 300b, to facilitate routing of utility lines (such as for electrical power, lighting control, HVAC, HVAC control, security systems, including energizing and communicating with smoke or heat sensors, etc.). Such floor chases 319 are adapted to communicate with wall chases 219 (see FIGS. 7A and 7B). Further details concerning floor chases 319 for floor component 300 are described in U.S. Nonprovisional patent application Ser. No. 16/786,130 entitled "Foldable Building Structures with Utility Channels and Laminate Enclosures," having the same inventors and filed on the same date as the subject application. The contents of that U.S. Nonprovisional patent application Ser. No. 16/786,130 entitled "Foldable Building Structures with Utility Channels and Laminate Enclosures," having the same inventors and filed on the same date as the subject application, are incorporated by reference as if fully set forth herein, particularly the details relating to floor chases 319, found for example at paragraphs 0137-0141 and in FIG. 7F thereof.

Enclosure Component Relationships and Assembly for Transport

For ease of transport and maximum design flexibility, it is preferred that there be a specific dimensional relationship among enclosure components 155.

FIG. 2A shows a top schematic view of the type 1 structure 151 shown in FIG. 1A, and includes a geometrical orthogonal grid for clarity of explaining the preferred dimensional relationships among enclosure components 155. The basic length used for dimensioning is indicated as "E" in FIG. 2A; the orthogonal grid overlaid in FIG. 2A is 24E long and 12 E wide, and illustrates the relative dimensions of the components.

More particularly, in FIG. 2A the two long wall components 200a are approximately 24E long, and the two short wall components 200b are approximately 12E long. Each of ceiling portions 400a, 400b and 400c is 24E long and 4E wide. The two floor portions 300a and 300b of type 1 structure 151 are shown in FIGS. 2A and 3A. Each of floor components 300a and 300b is 24E long; whereas floor component 300a is approximately 4E wide and floor component 300b is approximately 8E wide.

The shipping module 100 for type 1 structure 151, shown edge-on in FIG. 3A, generally includes a fixed space portion 102 defined by ceiling component 400a, floor component 300a, long wall component 200a-R and two first wall portions 200b-1 of short wall components 200b. As shown in FIG. 2A, the remaining two portions of short wall components 200b, second wall portions 200b-2, are folded inward and positioned against fixed space portion 102 (identified in FIG. 2A as wall portion 200b-2f when so folded and positioned). The three ceiling portions 400a, 400b and 400c of type 1 structure 151 are shown deployed in FIG. 1A. FIG. 3A, the shipping module 100 for type 1 structure 151, depicts ceiling components 400b and 400c stacked on top of the ceiling component 400a that in part defines fixed space portion 102. Long wall component 200a-P, shown in FIGS. 2A and 3A, is pivotally secured to floor portion 300b at the location of horizontal axis 105, and is vertically positioned against the outside of second wall portions 200b-2. In turn, floor portion 300b is vertically positioned proximate to fixed space portion 102, with long wall component 200a-P pending (i.e., hanging) from floor portion 300b between floor portion 300b and second wall portions 200b-2.

Sizing the enclosure components 155 of type 1 structure 151 according to the dimensional relationships disclosed above yields a compact shipping module 100, as can be seen from the figures. Thus shipping module 100, when dimensioned according to the relationships disclosed herein using an "E" dimension (see FIG. 2A) of approximately 19.5 inches (49.5 cm), and when its components are stacked and positioned as shown in FIG. 3A, has an overall length of approximately 39 feet (11.89 meters), an overall width of approximately 8.5 feet (2.59 meters) and an overall height of approximately 12.7 feet (3.87 meters). These overall dimensions are approximately the same or less than a typical shipping container.

Similarly, FIG. 2B shows a top schematic view of the type 2 finished structure 152 shown in FIG. 1B, and includes a geometrical orthogonal grid for clarity of explaining the preferred dimensional relationships among its enclosure components 155. The basic length used for dimensioning is indicated as "E" in FIG. 2B; the orthogonal grid overlaid in FIG. 2B is approximately 8E long and 8E.

More particularly, in FIG. 2B the four wall components 200s are approximately 8E long, and each of ceiling portions 400a, 400b and 400c is approximately 8E long and 2.67E wide. The two floor portions 300a and 300b of finished structure 152 are shown in FIGS. 2B and 3B. Each of floor components 300a and 300b is 8H long; whereas floor component 300a is approximately 3E wide and floor component 300b is approximately 5E wide.

The shipping module 100 for type 2 structure 152, shown edge-on in FIG. 3B, also generally includes a fixed space portion 102 defined by ceiling component 400a, floor component 300a, wall component 200s-R, wall portion 200s-1 and wall portion 200s-4. As show in FIG. 2B, second wall portion 200s-2 is folded inward and positioned generally against fixed space portion 102, whereas third wall portion 200s-3 is folded outward and positioned generally against second wall portions 200s-2 (wall portions 200s-2 and 200s-3 are respectively identified in FIG. 2B as portions 200s-2f and 200s-3f when so folded and positioned); so as to form an accordion fold having as its elements fixed space portion 102, second wall portion 200s-2 and third wall portion 200s-3. Fifth wall portion 200s-5 is folded inward and positioned generally against fixed space portion 102 (identified in FIG. 2B as wall portion 200s-5f when so folded and positioned). The three ceiling components 400a, 400b and 400c are shown deployed in FIG. 1B. FIG. 3B, the shipping module 100 for type 2 structure 152, depicts ceiling components 400b and 400c stacked on top of the ceiling component 400a that in part defines fixed space portion 102. Wall component 200s-P, shown in FIGS. 2B and 3B, is pivotally secured to floor portion 300b at the location of axis 105, and is vertically positioned against the outside of wall portions 200s-3 and 200s-5. In turn, floor portion 300b is vertically positioned proximate fixed space portion 102, with wall component 200s-P pending from floor portion 300b between floor portion 300b and wall portions 200s-3 and 200s-5.

Sizing the enclosure components 155 of type 2 structure 152 according to the dimensional relationships disclosed above yields a compact shipping module 100, as can be seen from the figures. Thus shipping module 100 depicted in FIG. 3B, when dimensioned according to the relationships disclosed herein using an "E" dimension (see FIG. 2B) of approximately 29 inches (73.7 cm), and when its components are stacked and positioned as shown in FIG. 3B, has an overall length of approximately 19 feet (5.79 m), an overall width of approximately 8.5 feet (2.59 meters) and an overall height of approximately 12.7 feet (3.87 meters). These overall dimensions are less than a typical shipping container.

The geometrical orthogonal grid referred also provides beneficial reference points for placement of floor chases 319, wall chases 219 and ceiling chases 440. When such chases are placed for example at specific "E" intervals that coincide with the grid spacing being used, they are easily located during structure finishing.

It is preferred that the fixed space portion 102 be in a relatively finished state prior to positioning (folding) together all other of the wall, ceiling and floor portions as described above. That is, the fixed space portion 102 is preferably fitted during manufacture with all mechanical and other functionality that the structure 150 will require, such as kitchens, bathrooms, laundry rooms, HVAC closets, fireplaces, clothing closets, storage areas, corridors, etc. A temporary member 103 (shown in FIG. 3A) provides support during shipping of type 1 structure 151 and is removed after delivery (there is no comparable temporary member utilized for shipping type 2 structure 152). Preferably after fixed space portion 102 is finished to the desired state, the remaining components are folded and positioned against fixed space portion 102 as described above. The components, so folded and positioned, permit the builder, in effect, to erect finished structure 150 simply by "unfolding" (deploying) the positioned components of shipping module 100.

As exemplified by long wall component 200a in FIG. 5A, each of the wall, floor and ceiling components 200, 300 and 400, and/or the portions thereof, can be sheathed in protective film 177 during fabrication and prior to forming the shipping module 100. Alternatively or in addition, the entire shipping module 100 can be sheathed in a protective film. These protective films accordingly constitute a means for protecting the shipping module 100 and components 200, 300 and 400 during shipping. In addition to the protection they give to the module and its components, such protective films have the added benefit of increasing the resistance of the components to such flexural and torsional stresses as may occur during transport of the components. These protective films constitute further means for rigidifying wall component 200 to improve its robustness during transport and erection of the structure at the construction site. It is preferred that such protective films remain in place until after the shipping module 100 is at the construction site, and then removed as required to facilitate enclosure component deployment and finishing.

Shipping Module Transport

The shipping module is shipped to the building site by appropriate transport means. One such transport means is disclosed in U.S. Patent Application Publication No. US 2019/0100127 A1, filed Sep. 27, 2018, and in International Publication No. WO 2019/070485 A1; the contents of which are incorporated by reference as if fully set forth herein, particularly as found at paragraphs 0020-0035 and in FIGS. 1A-2D thereof. As an alternative transport means, shipping module 100 can be shipped to the building site by means of a conventional truck trailer or a low bed trailer (also referred to as a lowboy trailer).

Structure Deployment and Finishing

At the building site, shipping module 100 is positioned over its desired location, such as over a prepared foundation; for example, a poured concrete slab, a poured concrete or cinder block foundation, sleeper beams or concrete posts or columns. This can be accomplished by using a crane, either to lift shipping module 100 from its transport and move it to the desired location, or by positioning the transport means over the desired location, lifting shipping module 100, then moving the transport means from the desired location, and then lowering shipping module 100 to a rest state at the desired location.

Lifting Poles

Figure 11A:
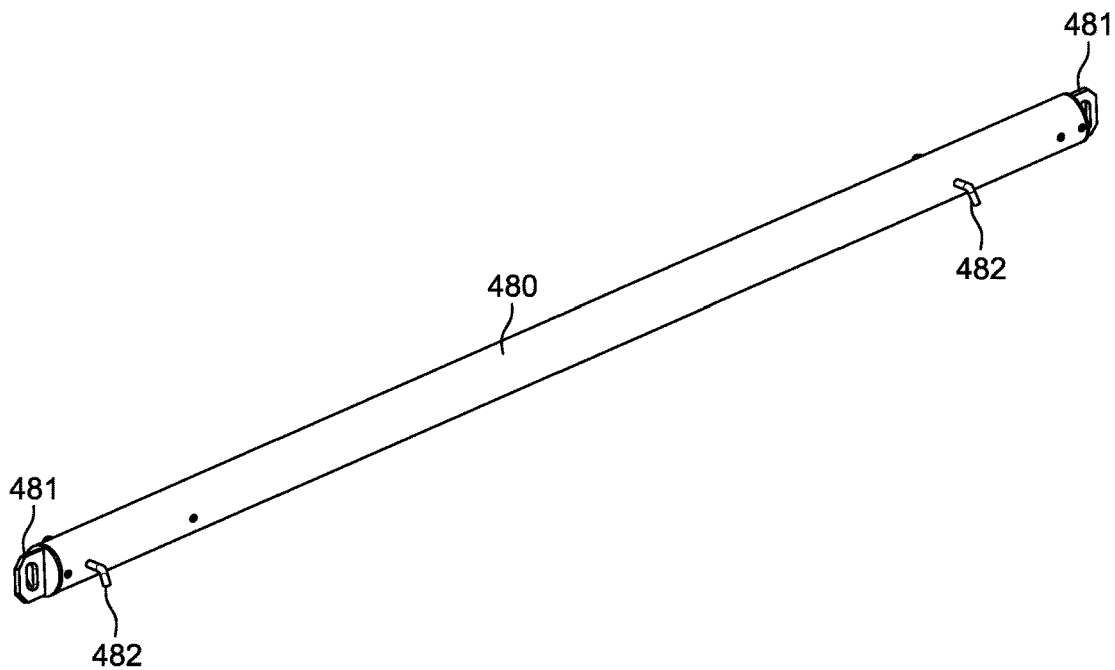
FIG. 11A is a lifting pole in accordance with the present inventions.

Positioning shipping module 100 over its desired location can be facilitated by use of two or more lifting poles 480, an example of which is shown in FIG. 11A. Lifting pole 480 is a steel cylindrical elongate member fitted at each end with a lifting eye 481. The overall length of lifting pole 480 exceeds the width of floor portion 300a and shipping module 100, such that cables can be run between lifting eyes 481 and suspended from the load block of a mobile crane. A suitable number of lifting poles 480 can be included with shipping module 100 at the factory prior to transport, or separately provided at the building site.

Figure 11B:
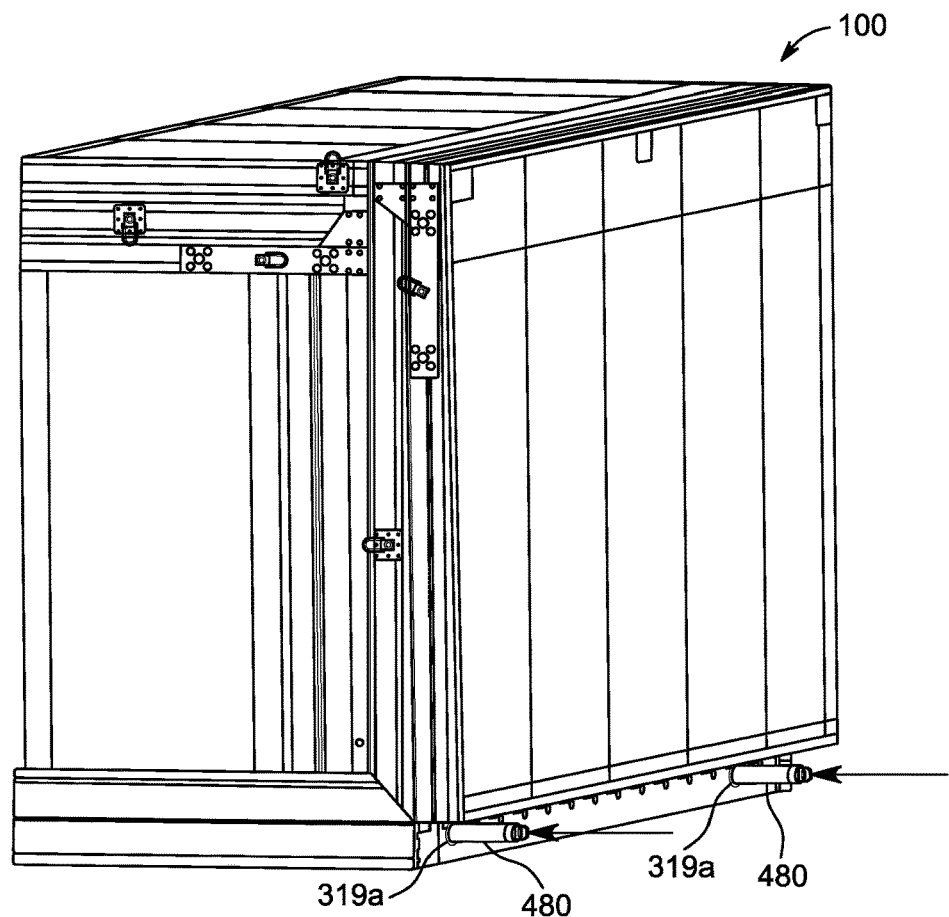
FIG. 11B is the shipping module of FIG. 10 depicting the placement of the lifting poles of the present inventions.

In use at the building site, two or more lifting poles 480 are passed through corresponding passages in floor portion 300a, such as floor chases 319 or two or more other passages of appropriate diameter, as is shown labeled 319a in FIG. 11B; if select floor chases 319 are to be utilized, they can be given increased diameters relative to the other floor chases 319, to accommodate the diameter of lifting poles 480. The selected passages through which lifting poles 480 are intended to be passed can be reinforced with PVC conduit, preferably as part of fabrication prior to shipment. The poles 480 are optionally restrained from longitudinal movement by inserting two securing pins 482, shown in FIG. 11A, in complementary apertures in poles 480. A mobile crane can then be utilized to move shipping module 100 from its transport means to the desired location.

Alternatively, particularly if the transport means is a low bed trailer, the transport means can be positioned over the desired location, lifting poles 480 can be inserted through floor portion 300a of shipping module 100 as described above, and then jack stands can be positioned under the poles. The jack stands can then be actuated to lift shipping module 100 above the transport means. The transport means can then be moved from desired location and the jacks stands can again be actuated to lower the shipping module to its final resting state at the desired location. Thus in this alternative, there is no need for a crane to move shipping module 100 to its desired location.

Following positioning of shipping module 100 at the building site, the appropriate portions of wall, floor and ceiling components 200, 300 and 400 are "unfolded" (i.e., deployed), according to the following sequences, to yield finished structure 150.

For type 1 structure 151, unfolding (enclosure component and component portion deployment) occurs in the following sequence: (1) floor portion 300b is pivotally rotated about horizontal axis 305 shown in FIG. 3A to an unfolded position, (2) wall component 200a-P is pivotally rotated about horizontal axis 105 shown in FIG. 3A to an unfolded position, (3) wall portions 200b-2 of short wall components 200b are pivotally rotated about vertical axes 191 shown in FIG. 2A to unfolded positions, and (4) ceiling portions 400b and 400c are pivotally rotated about horizontal axes 405a and 405b respectively to their unfolded positions.

For type 2 structure 152, unfolding occurs in the following sequence: (1) floor portion 300b is pivotally rotated about horizontal axis 305 shown in FIG. 3B to an unfolded position, (2) wall component 200s-P is pivotally rotated about horizontal axis 105 shown in FIG. 3B (behind perimeter board 312) to an unfolded position, (3) wall portions wall portions 200s-2, 200s-3 and 200s-5 are pivotally rotated about vertical axes 192, 193 and 194 respectively to unfolded positions, and (4) ceiling portions 400b and 400c are pivotally rotated about horizontal axes 405a and 405b respectively to unfolded positions.

Friction-Reducing Components

To facilitate deployment, friction-reducing components can be provided at appropriate points on select enclosure components 155 of shipping module 100. As one specific implementation of the use of friction-reducing components, casters, such as roller-ball casters 498, can be provided at select locations along the bottom of such wall portions as are moved during structure deployment. Each of these roller-ball casters 498, shown in FIG. 14A, comprises a roller ball held in a housing in such manner that only a portion of the ball extends below the housing, while the housing permits the ball to rotate in any direction. For example, referring to FIG. 13D, which depicts a type 2 structure 152, roller-ball casters 498 can be provided proximate to locations "C" (behind perimeter board 312) at the bottom of wall portions 200s-2 and 200s-3 (perimeter board 312 in FIG. 13D is shown cut-away in two areas to depict roller-ball casters 498 as installed at the bottom of wall portions 200s-2 and 200s-3). Roller-ball casters 498 ease movement of wall portions 200s-2 and 200s-3 over floor component 300 as deployment proceeds. At least one roller-ball caster 498 also can be provided for wall portion 200s-5 at a similar or otherwise suitable location or locations; and, at like comparable location or locations for wall portions 200b-2 of type 1 structure 151. It is preferred that roller-ball casters 498 be placed at appropriate locations during the manufacture of wall components 200, and left in place following deployment of the structure 150.

As another specific implementation of the use of friction-reducing components, plural wheel casters 499 can be provided at select locations on such ceiling portions as are moved during structure deployment. Each of the wheel casters 499, shown in FIG. 14B, comprises a wheel rotatably mounted in a frame so as to trace a linear track when displaced. A wheel caster 499 can be secured to each of the two outside forward edges of ceiling portion 400c. For example, referring to FIGS. 13D and 13E, which depict a partially deployed ceiling component 400 of a type 2 structure 152, two wheel casters 499 can be provided at locations "R". One of those locations R is on or near the leading edge of ceiling portion 400c, proximate to the corner of ceiling portion 400c that is supported by wall portions 200s-2 and 200s-3 as ceiling portions 400b and 400c are deployed. The other of those locations R likewise is on or near the leading edge of ceiling portion 400c, proximate to the corner of ceiling portion 400c that is supported by wall portions 200s-5 as ceiling portions 400b and 400c are deployed. Wheel casters 499 accordingly ease movement of ceiling portion 400c across the top edge of wall components 200s. Wheel casters 499 also can be provided at like locations for ceiling portion 400c in the case of type 1 structure 151, to ease movement of ceiling portion 400c across the top edge of wall components 200b. It is preferred that wheel casters 499 be placed at appropriate locations during the manufacture of ceiling components 400, and then removed following deployment of the structure 150.

Deployment Equipment

A mobile crane can be used to assist in the deployment of certain of the enclosure components 155, specifically ceiling portions 400b and 400c, floor portion 300b, as well as the wall component 200 pivotally secured to floor portion 300b (200a-P for type 1 structure 151, 200s-P for type 2 structure 152).

Alternatively, a number of deployment components can be provided to assist in enclosure component deployment without use of a mobile crane. One or more or all of the deployment components can be included with shipping module 100 at the factory prior to transport, or separately provided and then secured as necessary at the building site to locations optionally previously prepared for them. In the figures below, deployment components and techniques are illustrated in connection with the deployment of a type 2 structure 152, but the described components and techniques can be utilized in the deployment of a type 1 structure 151 or any other structure fabricated consistent with this disclosure. Although for illustrative purposes the deployment components described herein are shown only on the side of shipping module 100 that will be first transverse edge 108 of finished structure 150 upon completion of deployment, it should be understood that like deployment components are positioned as well on the side of shipping module 100 that will be second transverse edge 110 upon completion of deployment.

Figure 12A:
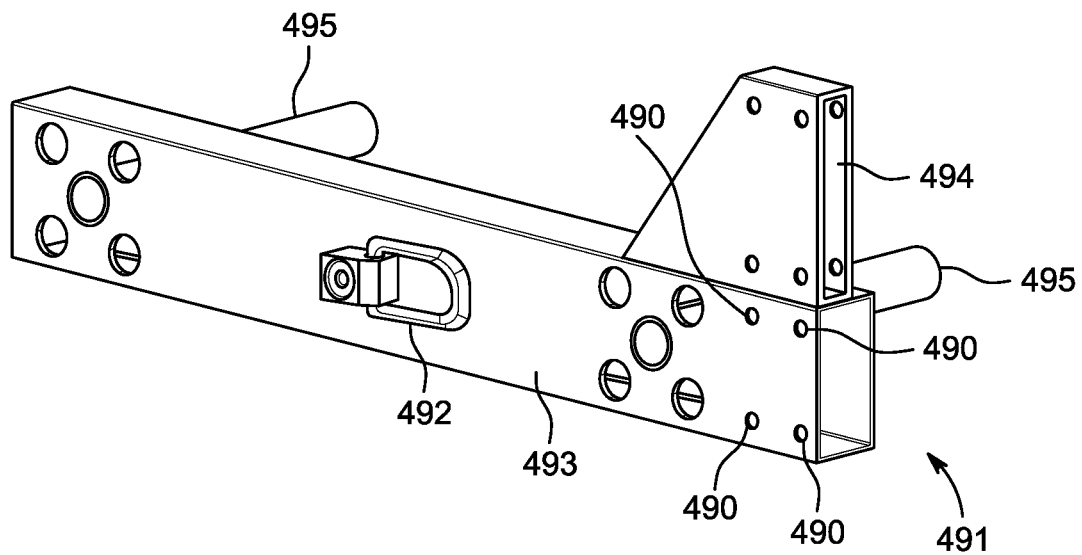
FIG. 12A is a deployment bracket in accordance with the present inventions.
Figure 12B:
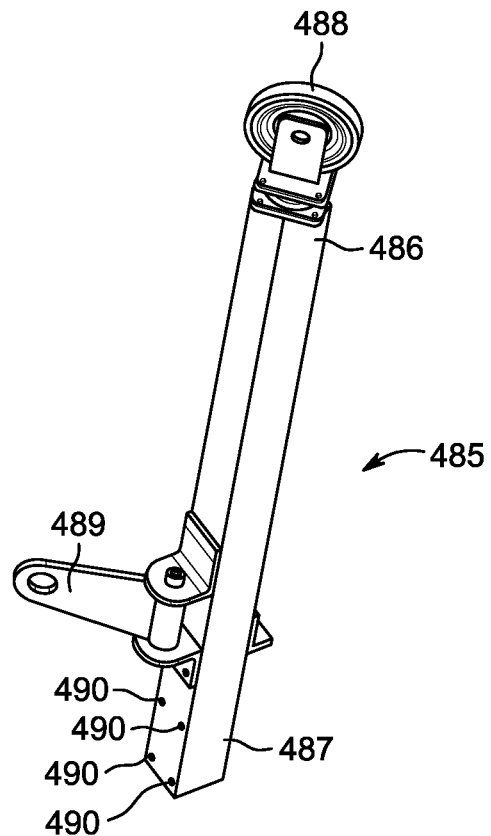
FIG. 12B is a deployment strut in accordance with the present inventions.

Deployment Bracket (491). A particular deployment component, deployment bracket 491, is shown in FIG. 12A. Deployment bracket 491 is an elongate steel member having a rectangular or square channel cross section, with a strut end 493. A gusset section 494 having, in the embodiment shown, a rectangular cross section, is fastened to strut end 493, as by bolting or welding, and a shackle 492 is secured proximate the mid-point of deployment bracket 491. Optionally, for bracing deployment bracket 491 two spaced-apart cylindrical steel pipes 495 are welded through the deployment bracket 491, each having a sufficient length so as to be received in appropriately positioned cylindrical apertures located in floor component 300 and ceiling component 300.

Deployment Strut (485). Deployment bracket 491 is utilized during deployment to secure and support a related deployment component, deployment strut 485 shown in FIG. 12B. Deployment bracket 491 is an elongate steel member having a rectangular or square channel cross section. Deployment strut 485 includes a free end 486 on which is secured a rotatable sheave 488 that has a swivel connection to deployment strut 485 with the goal that any line passing around it will run true. Deployment strut 485 additionally includes a fastening end 487 (distal from free end 486) which is adapted to be removably secured to each of deployment bracket 491, for example with bolts passed through apertures 490 and received in comparably patterned apertures 490 in deployment bracket 491, and with gusset section 494 assisting in supporting deployment strut 485. There is also provided a tang 489 secured to deployment strut 485 proximate to fastening end 487 by means of a swivel connection.

Figure 10:
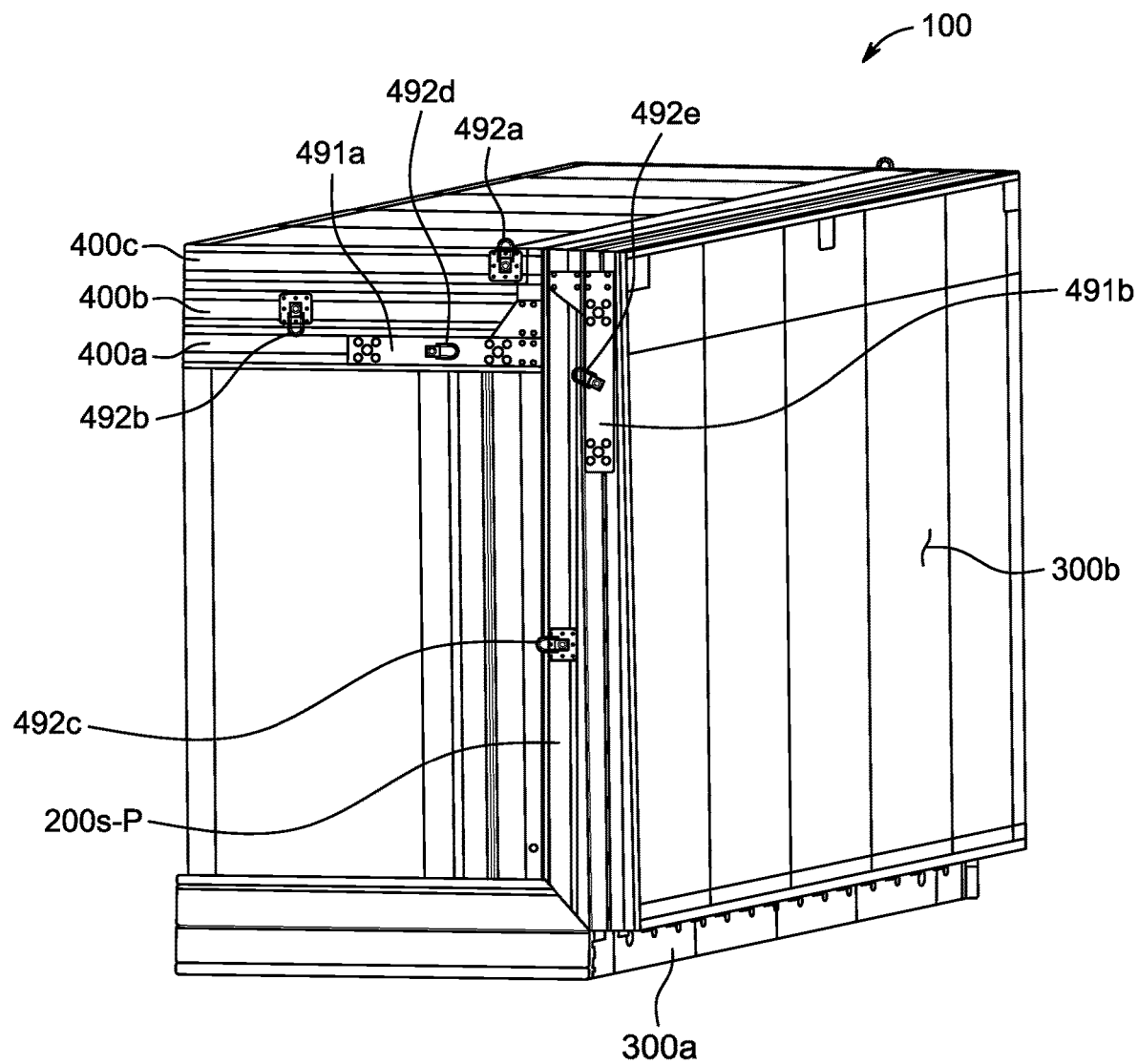
FIG. 10 is a perspective view of a shipping module prepared in accordance with the present inventions.

It is preferred that there be a deployment bracket 491 secured at each location on shipping module 100 where utilization of deployment strut 485 facilitates deployment. In particular, as shown in FIG. 10, a deployment bracket 491b is secured to the free end of floor portion 300b, and a deployment bracket 491a is secured to roof portion 400a proximate to the location where roof portion 400a is pivotally joined to roof portion 400b. Deployment bracket 491a is identical in structure to deployment bracket 491b. Thus the shipping module 100 for the type 2 structure 152 shown in FIG. 10 and elsewhere utilizes four deployment brackets (two on each side), denominated 491a and 491b in the figures, and utilizes two deployment struts 485 (one on each side) during deployment.

The deployment strut 485 can be secured and removed as appropriate between deployment brackets 491a and 491b to facilitate deployment, as described below and as illustrated in the accompanying figures.

Shackles (492). As additional deployment components, there are provided a number of shackles 492 at appropriate locations to facilitate deployment. In particular, for the shipping module 100 shown in FIG. 10, a shackle 492a is secured in proximity to the leading edge of roof portion 400c, a shackle 492b is secured to roof portion 400b at approximately the location shown in that figure (roughly 7/10 of the width of ceiling portion 400b away from the free end of roof portion 400c), and a shackle 492c is secured to the wall component 200s-P (which is pivotally secured to floor portion 300b) at approximately the location shown in FIG. 10 (roughly 6/10 of the width of wall component 200s-P away from its top edge). As generally indicated above, shackle 492d is located on deployment bracket 491a, and shackle 492e is located on deployment bracket 491b. The location and number of shackles 491 can be varied in accordance with preference, and as is desirable to accommodate dimensions and configurations different from those in FIG. 10.

The attachment of deployment brackets 491 and shackles 492 to the enclosure components and portions referenced above can be carried out for example in the course of fabrication and prior to shipment of shipping module 100. Likewise shackle 492d is preferably secured to the exterior face of deployment bracket 491a during its fabrication, and shackle 492e is preferably secured to the exterior face of deployment bracket 491b during its fabrication.

Use of Deployment Equipment

One technique for using deployment components described above during deployment (unfolding) of the enclosure components 155 is described presently. Although reference is made only to the deployment components located on first transverse edge 108, it should be understood that the described steps are carried out simultaneously for the deployment components located on second transverse edge 110 as well.

Figure 13A:
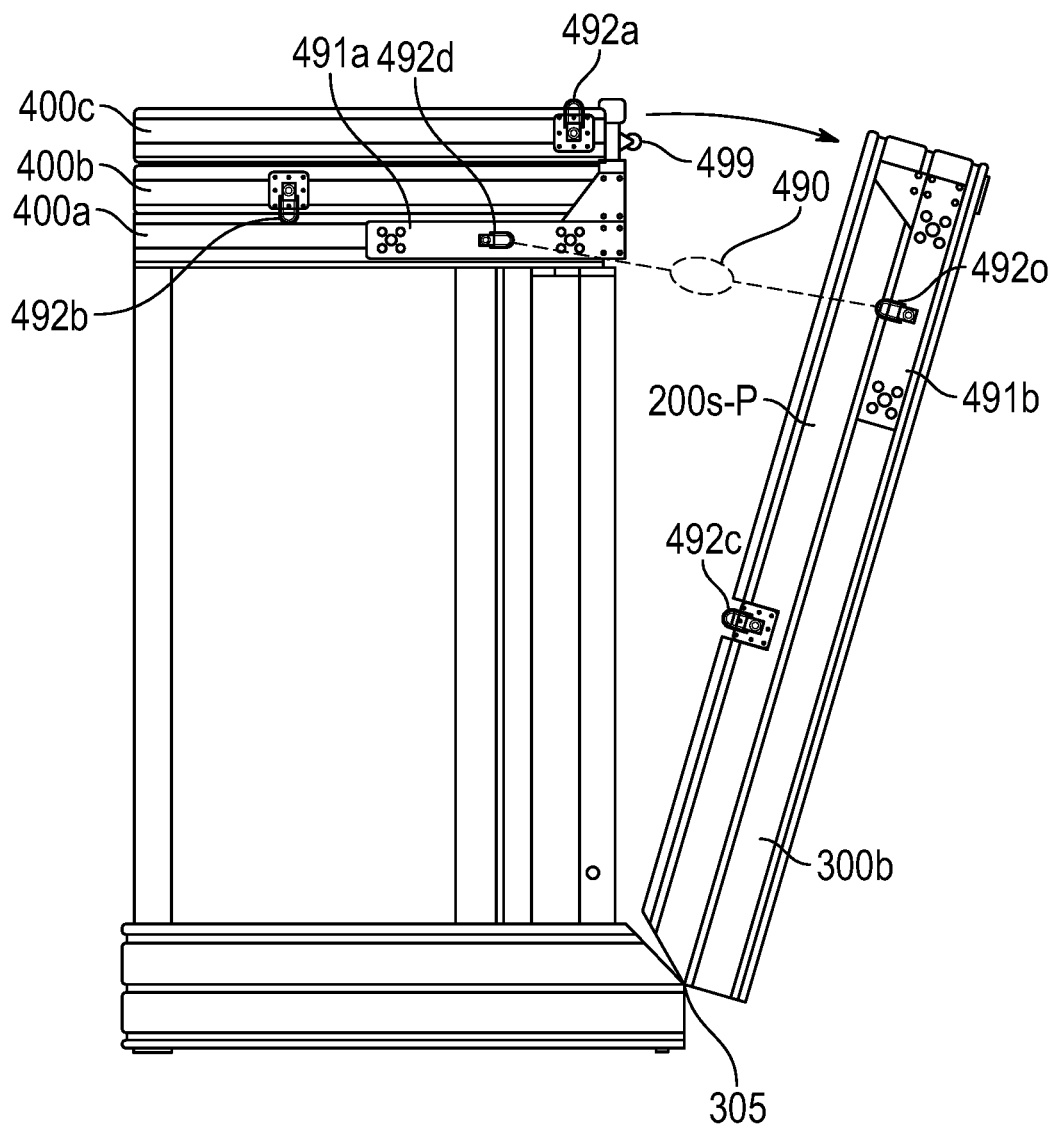
FIG. 13A is a side view of a shipping module prepared in accordance with the present inventions, depicting a partially deployed floor portion.

Referring to FIG. 13A, a wire rope hand winch 490 (typically having a rotating drum or reel from which a line can be coiled and extended) is fastened between shackles 492d and 492e, and then floor portion 300b (with wall component 200s-P riding on it) is lowered to ground level. Following this, deployment strut 485 is secured to deployment bracket 491b, in the position and orientation shown in FIG. 13B. Following this, wire rope hand winch 490 is fastened to tang 489, and the winch wire is passed over sheave 488 and fastened to shackle 492c. Hand winch 490 is then used to raise the wall component 200s-P, which is pivotally secured to floor portion 300b, to its fully deployed position. Once that wall component 200s-P is fully deployed, deployment strut 485 is removed from deployment bracket 491b and wall portions 200s-2, 200s-3 and 200s-5 can be unfolded to their fully deployed positions.

Figure 13C:
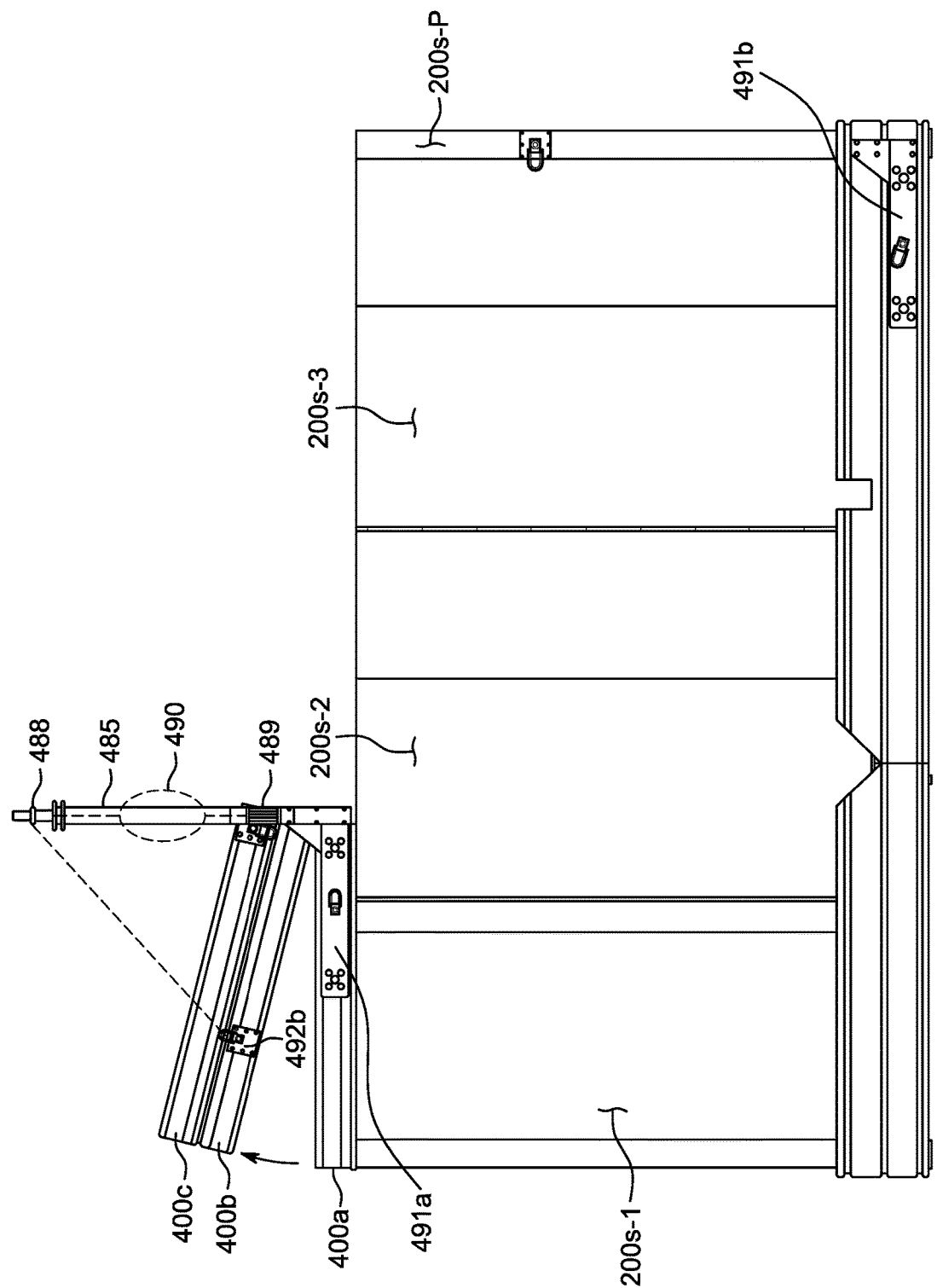
FIG. 13C is a side view of a shipping module prepared in accordance with the present inventions, depicting as fully deployed the wall component that is partially deployed in FIG. 13B, and depicting deployment of two ceiling portions of the ceiling component of the present inventions in its initial stages.
Figure 13D:
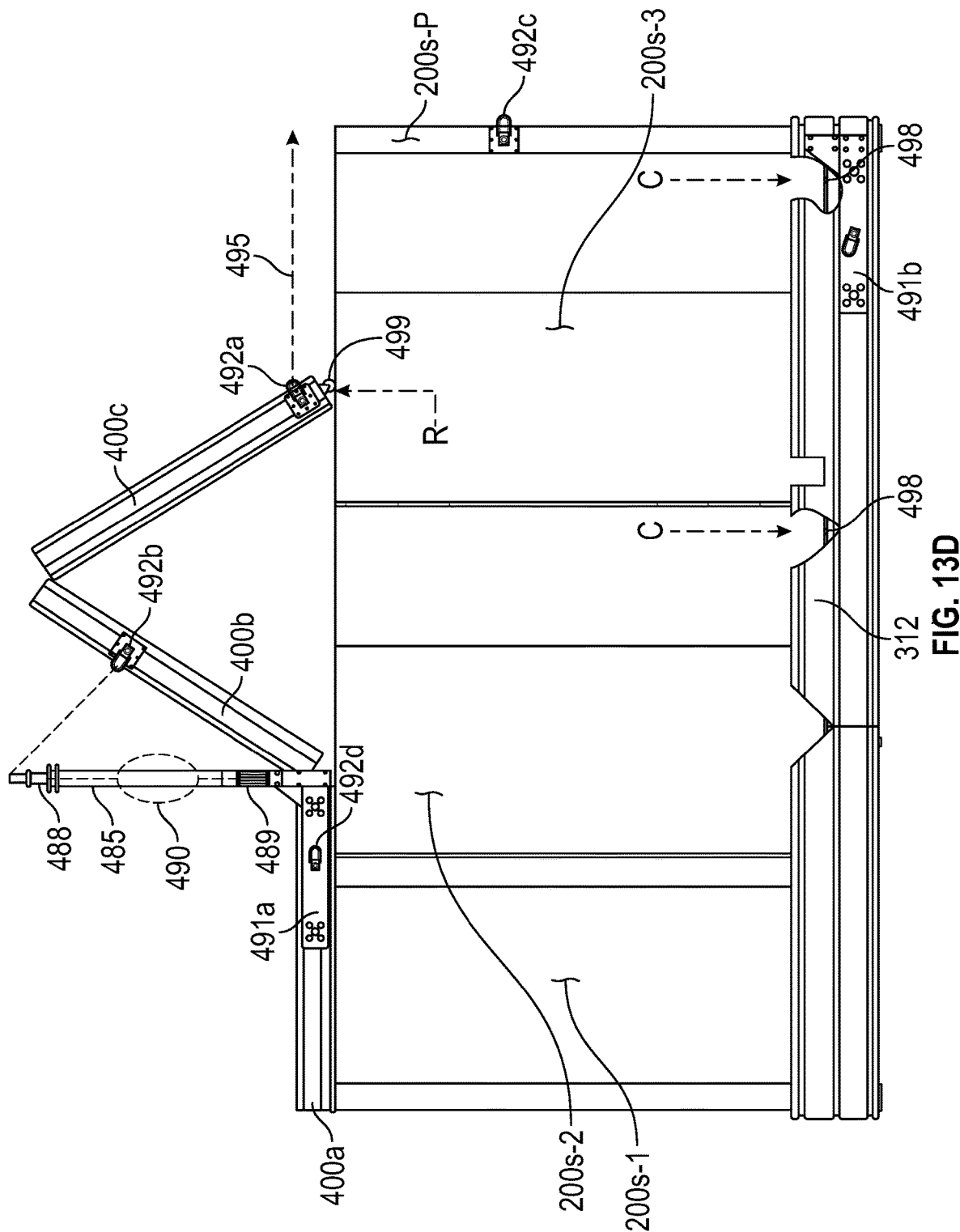
FIG. 13D is a side view of a shipping module prepared in accordance with the present inventions, depicting deployment of two ceiling portions of the ceiling component of the present inventions in its later stages.
Figure 13E:
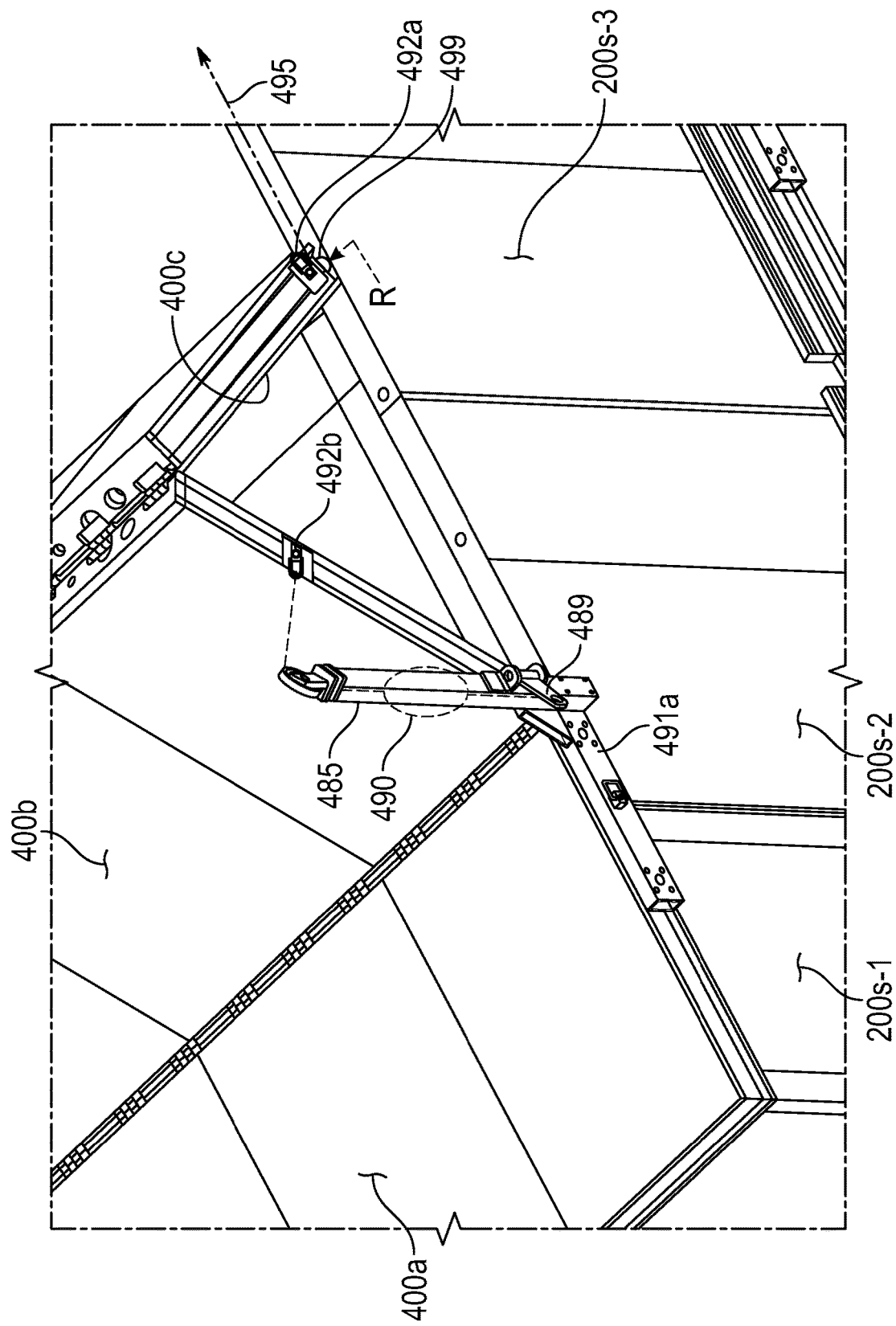
FIG. 13E is a perspective view corresponding to the side view of FIG. 13D.
Figure 14A:
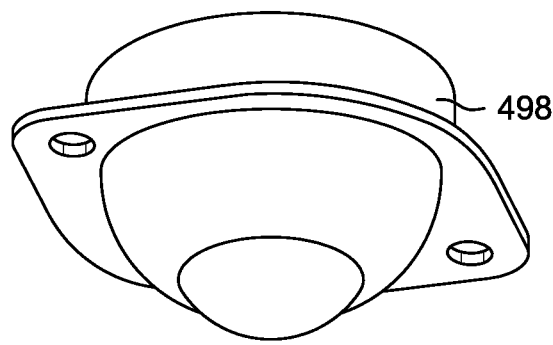
FIGS. 14A and 14B are respectively an exemplary caster and roller in accordance with the present inventions.
Figure 14B:
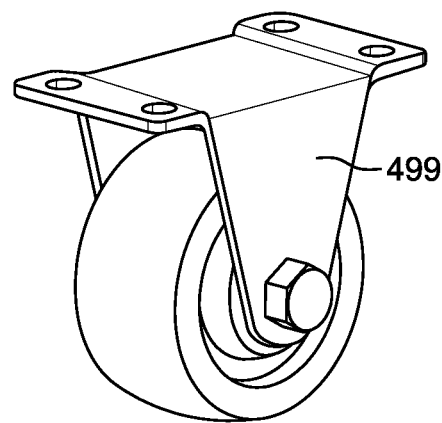

Following full deployment of wall component 200s-P and wall portions 200s-2, 200s-3 and 200s-5, deployment strut 485 is secured onto bracket 491a, in the position and orientation shown in FIG. 13C. Hand winch 490 is then fastened to tang 489, the winch wire is passed over sheave 488 and fastened to shackle 492b, and the hand winch is actuated to raise ceiling portions 400b and 400c. As ceiling portions 400b and 400c near the vertical position, a wire or rope guide line 495 can be secured to shackle 492a to separate ceiling portions 400b and 400c and urge ceiling portions 400 forward, so as to form with ceiling portions 400b and 400c the inverted "V" orientation shown in FIGS. 13D and 13E. The hand winch is then used to lower ceiling portions 400b and 400c to their fully deployed positions.

As can therefore be seen, by use of the deployment components just described, a shipping module 100 can be fully deployed entirely with hand labor, without the need for employing a mobile crane.

Notably, baseboard 310 in appropriate locations functions as a "stop" to arrest the unfolding of a wall component or a wall portion at its intended deployed position. Thus for example, baseboard 310 in FIG. 3A, depicting a type 1 structure 151, arrests the unfolding of the long wall 200a-P shown in the figure, when long wall 200a-P is fully deployed in its desired vertical position. Likewise, perimeter board 312 in FIG. 3B, depicting a type 2 structure 152, performs a similar function with respect to a wall 200s-P, and also with respect to wall portions 200s-2, 200s-3 and 200s-5. Further, baseboard 310 provides a structure for securing a deployed wall component in its deployed position; thus for example, baseboard 310 is provided in FIG. 6A with plural spaced-apart apertures 311 through which fasteners may be inserted to secure long wall 200a in place.

After deployment, the enclosure components 155 are secured together to form finished structure 150, shown in FIGS. 1A and 1B. If any temporary hinge mechanisms have been utilized, then these temporary hinge mechanisms can be removed if desired and the enclosure components 155 can be secured together. If certain of the enclosure component perimeter structures disclosed in U.S. Nonprovisional patent application Ser. No. 16/786,202 entitled "Enclosure Component Perimeter Structures," having the same inventors and filed on the same date as the subject application, have been utilized, specifically those described for example at paragraphs 121-157 and in FIGS. 12-15, then certain finishing operations preferably are performed in regard to such structures, as described therein. The contents of that U.S. Nonprovisional patent application Ser. No. 16/786,202 entitled "Enclosure Component Perimeter Structures," having the same inventors and filed on the same date as the subject application, are incorporated by reference as if fully set forth herein, particularly including the finishing operations performed in regard to enclosure component perimeter structures, described for example at paragraphs 179-182 and in connection with FIGS. 13C, 13F, 14C, 14E, 15 and 17 thereof.

After deployment and securing of the enclosure components 155, one or more pre-selected chases located in wall components 200, in floor component 300 and in ceiling component 400 can be wired and connected. Prior to, during or following deployment and securing of the enclosure components 155, as desired, apertures 202, 204 for one or more doors and windows are cut at desired locations in the wall components 200, and appropriate door and window assemblies are positioned and fastened in the apertures 202, 204. Additional municipal hook-ups are made to water and sewer lines to complete structure 150, as relevant here.

The foregoing detailed description is for illustration only and is not to be deemed as limiting the invention, which is defined in the appended claims.

What is claimed is:

1. A foldable building structure package having a first folded configuration and a second unfolded configuration, comprising:
   a fixed space portion including a first wall component, a first floor portion and a first ceiling portion, the first ceiling portion having a first edge overlying the first wall component, a second edge adjoining the first edge, and a third edge adjoining the second edge;
   a first deployment bracket secured to the second edge of the first ceiling portion;
   a second ceiling portion pivotally attached to the third edge of the first ceiling portion and movable between a folded position, which overlies the fixed space portion, and an unfolded position;
   a third ceiling portion pivotally attached to the second ceiling portion and movable between a folded position, which overlies the second ceiling portion and the fixed space portion, and an unfolded position;
   the second and third ceiling portions movable from their respective folded positions to their respective unfolded positions to form with the first ceiling portion a ceiling component of the building structure when the second and third ceiling portions are in their respective unfolded positions;
   a second floor portion having a first edge pivotally attached to the first floor portion, a second edge adjoining the first edge, and a third edge adjoining the second edge, the second floor portion movable between a folded approximately vertical position proximate the fixed space portion, and an unfolded position to form with the first floor portion a floor component of the building structure when the second floor portion is in its unfolded position;
   a second deployment bracket secured to the second edge of the second floor portion;
   a second wall component pivotally attached to the second floor portion proximate the third edge of the second floor portion and movable between a folded position pending from the second floor portion when the second floor portion is in its folded position, and an unfolded position on the floor component when the second floor portion is in its unfolded position; and
   a deployment strut having a first end and a second end, the first end adapted to be secured to and removed from each of the first deployment bracket and the second deployment bracket, and the second end having a rotatable sheave.

2. The foldable building structure package as in claim 1, further comprising a first fastener, adapted to receive and secure a first end of an extendible line, and positioned on the first deployment bracket; and a second fastener, adapted to receive and secure a second end of the extendible line, and positioned on the second deployment bracket; the first and second fasteners respectively positioned on the first and second deployment brackets to lower the second floor portion when the extendible line is extended between the first fastener and the second fastener, the first end is secured to the first fastener and the second end is secured to the second fastener.

3. The foldable building structure package as in claim 1, further comprising a fastener positioned on the second wall component, the fastener adapted to receive and secure a wall raising line, and being positioned on the second wall component so as to raise the second wall component when (a) the second floor portion is in its unfolded position, (b) the wall raising line is run over the rotatable sheave of the deployment strut when the deployment strut is secured to the second deployment bracket, (c) a bitter end of the wall raising line is secured to the fastener and (d) tensile force is applied to the wall raising line.

4. The foldable building structure package as in claim 1, further comprising a fastener positioned on the second ceiling portion, the fourth fastener adapted to receive and secure a ceiling raising line, and being positioned on the second ceiling portion so as to raise the second ceiling portion when (a) the ceiling raising line is run over the rotatable sheave of the deployment strut when the deployment strut is secured to the first deployment bracket, (b) a bitter end of the ceiling raising first line is secured to the fastener, and (c) tensile force is applied to the ceiling raising line.

5. The foldable building structure package as in claim 1, further comprising (a) a first fastener positioned on the second ceiling portion, the first fastener adapted to receive and secure a first line, and being positioned on the second ceiling portion so as to lower the second ceiling portion when (i) the first line is run over the rotatable sheave of the deployment strut when the deployment strut is secured to the first deployment bracket, and (ii) a bitter end of the first line is secured to the first fastener; and (b) a second fastener positioned on the third ceiling portion, the second fastener adapted to receive and secure a second line, and being positioned on the third ceiling portion so as to urge the third ceiling portion toward its unfolded position while lowering the second ceiling portion when (i) a bitter end of the second line is secured to the second fastener, and (ii) tensile force is applied to the second line while lowering the second ceiling portion.

6. A method of deploying a folded building structure, the building structure including (i) a building assembly including a fixed space portion and a floor portion joined in an unfolded position to the fixed space portion, (ii) a first enclosure member and (iii) a second enclosure member, the first and second enclosure members each being joined in a folded position to the building assembly and moveable with respect thereto, the method comprising:
(a) securing to the building assembly at a first location a removable deployment strut proximate a first fastening end of the deployment strut, the removable deployment strut having a rotatable sheave at a second free end distal from the first fastening end;
(b) securing a working end of a line to a fastener located on the first enclosure member;
(c) positioning the line over the rotatable sheave;
(d) tensioning the line to move the first enclosure member from the folded position;
(e) removing the removable deployment strut from the first location of the building assembly;
(f) securing to the building assembly at a second location different from the first location the removable deployment strut proximate the first fastening end of the deployment strut;
(g) securing a working end of a line to a fastener located on the second enclosure member;
(h) positioning the line over the rotatable sheave; and
(i) tensioning the line to move the second enclosure member from the folded position.

7. The method as in claim 6, wherein step (a) further comprises securing to a first deployment bracket, which is secured to the building assembly at the first location, the removable deployment strut.

8. The method of claim 6, wherein step (a) further comprises securing the removable deployment strut to the building assembly at a first location on the floor portion.

9. A folded building structure package having portions moveable from a folded position to an unfolded position to form a building structure, comprising:
a first floor portion having a first edge, an opposed second edge meeting a first floor surface to form a first junction, and a thickness, the first floor portion defining two spaced-apart passages within the thickness and between the first edge and the second edge, the two spaced-apart passages respectively defining a first aperture and a second aperture in the second edge;
a second floor portion having a third edge meeting a second floor surface to form a second junction, and a thickness the same as the first floor portion;
a hinge fastened to the first floor portion proximate the first junction and fastened to the second floor portion proximate the second junction so that the second floor portion is moveable with respect to the first floor portion from a folded position to an unfolded position to form a floor component of the building structure with the second and third edges in a facing relationship and the third edge covering the first and second apertures; and
two elongate members, each having a length greater than the width of the first enclosure component portion and adapted to be received in either of the two spaced-apart passages.

10. The folded building structure package as in claim 9, further comprising means for restraining each of the two elongate members from movement within either of the two spaced-apart passages.

11. The folded building structure package as in claim 9, wherein each of the two elongate members has a first end including a lifting eye and a second end including a lifting eye.

12. The folding building structure package as in claim 9, wherein three or more spaced-apart cylindrical passages are defined in the thickness of the first floor portion, and a first and a second of the three or more spaced-apart cylindrical passages have diameters greater than the diameter of the other three or more of spaced-apart cylindrical passages.

13. The folded building structure package as in claim 9, wherein each of the two spaced-apart passages is cylindrical.

14. The folded building structure package as in claim 13, wherein the two spaced-apart cylindrical passages are defined in a foam material within the thickness of the first floor portion, and the cylindrical passages are reinforced by plastic conduit.

15. A foldable building structure comprising:
a fixed space portion including a floor portion, a first ceiling portion, and a first wall portion;
a second ceiling portion pivotally attached to the first ceiling portion and movable between a folded position, which overlies the fixed space portion, and a unfolded position;
a third ceiling portion pivotally attached to the second ceiling portion and movable between a folded position, which overlies the second ceiling portion and the fixed space portion, and an unfolded position;
the second and third ceiling portions movable from their respective folded positions to their respective unfolded positions to form with the first ceiling portion a ceiling component of the building structure when the second and third ceiling portions are in their respective unfolded positions;
a second wall portion pivotally attached to the first wall portion and movable between a folded position, which is proximate to the fixed space portion, and an unfolded position to form with the first wall portion all or part of a wall component of the building structure when in the unfolded position, the second wall portion including a top edge having a horizontal length; and
a friction-reducing component secured proximate a leading edge of the third ceiling portion at a location, relative to the top edge of the second wall portion in its unfolded position, which engages the top edge of the second wall portion for a least a portion of its horizontal length when the third ceiling portion is moved between a folded position and a unfolded position.

16. The foldable building structure of claim 15, wherein the friction-reducing component is a wheel caster that rolls on the top edge of the second wall portion for a least a portion of its horizontal length when the third ceiling portion is moved between a folded position and a unfolded position.

* * * * *